(12) United States Patent
Higashino et al.

(10) Patent No.: US 6,337,529 B1
(45) Date of Patent: Jan. 8, 2002

(54) AUTOMOTIVE ALTERNATOR

(75) Inventors: Kyoko Higashino; Katsumi Adachi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,772

(22) Filed: Aug. 11, 2000

(30) Foreign Application Priority Data

Jan. 25, 2000 (JP) ........................................... 12-015954

(51) Int. Cl.[7] ......................... H02K 15/02; H02K 19/22
(52) U.S. Cl. ...................... 310/254; 310/216; 310/259; 310/42; 29/596
(58) Field of Search ............................. 310/254, 216, 310/217, 42, 258, 259; 29/596

(56) References Cited

U.S. PATENT DOCUMENTS 2,390,863 A * 12/1945 Amidon et al. ............. 310/217
5,534,736 A * 7/1996 Johnson ....................... 310/91
5,861,699 A * 1/1999 Kopac ......................... 310/254
6,222,296 B1 * 4/2001 Sakai et al. ................. 310/216

FOREIGN PATENT DOCUMENTS

JP 9-103052 4/1997 .......... H02K/15/02

* cited by examiner

Primary Examiner—Burton S. Mullins
(74) Attorney, Agent, or Firm—Sughrue Mion, PLLC

(57) ABSTRACT

A stator core has a laminated core, and a polyphase stator winding installed in slots at a predetermined slot pitch, the laminated core being formed into an annular shape by forming a main laminated body by laminating a number of main lamination plates, forming a laminated body by laminating an end plate having higher rigidity than the main lamination plates onto one end surface of the main laminated body, disposing the polyphase stator winding in the slots, and placing end portions of the laminated body in contact with each other by bending the laminated body such that opening portions of the slots are on an inner circumferential side.

11 Claims, 32 Drawing Sheets

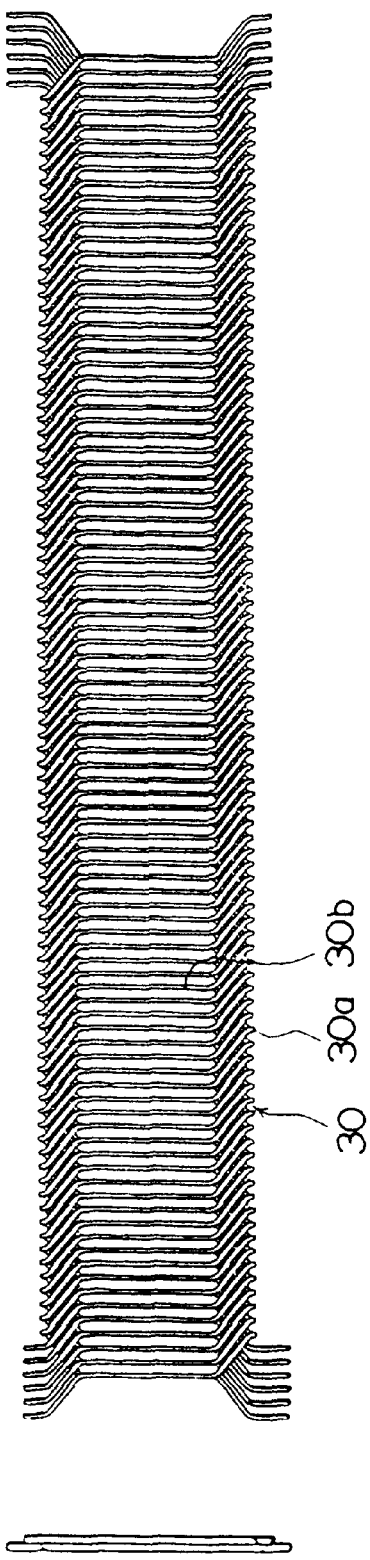

AUTOMOTIVE ALTERNATOR

BACKGROUND OF THE INVENTION

1. Field of the Invention

The present invention relates to an alternator driven by an internal combustion engine, for example, and in particular, relates to a stator construction for an automotive alternator mounted to an automotive vehicle such as a passenger car or a truck.

2. Description of the Related Art

FIG. 34 is a perspective showing an example of a stator of a conventional automotive alternator. In the figure, the stator 108 includes a cylindrical stator core 136 having a number of slots 136, and stator winding groups 135 arranged inside the slots 136a. Furthermore, the stator core 136 has a weld portion 136b at one circumferential position.

Next, a method for manufacturing the stator 108 will be explained. First, the belt-shaped bodies 120 shown in FIG. 35 are punched into a comb-shape and cut off at a predetermined length. Thereafter, the cutoff belt-shaped bodies 120 are laminated to form a parallelepiped laminated body 150, as shown in FIG. 36. Belt-shaped bodies 120 having a width of 12 mm and a thickness of 1 mm, for example, are used, all the bodies having the same thickness. Then, the laminated body 150 is formed into a parallelepiped having dimensions of 12 mm×336 mm×27 mm, for example.

At the same time, the stator winding groups 135 are first formed into an overall flat shape such that the coils can be inserted without modification into every third slot 136a in FIG. 36, and are then inserted into the slots 136a as shown in FIG. 37. Thereafter, the laminated body 150 is bent into a cylindrical shape by means of a shaping device (not shown) to form the stator core 136. After the bending process, both ends of the laminated body 150 are joined together by welding at the weld portion 136b in FIG. 36.

By being rolled into the cylindrical shape, the stator core 136 prepared in this way can be provided with a number of slots 136a opening towards a center, and with teeth 136c defining each slot 136a. There are thirty-six slots 136a and thirty-six teeth 136c per phase per pole (3 phases×12 poles).

In this sort of method for manufacturing the stator 108, when inserting the stator winding groups into the slots 136a, the stator winding groups may be moved in one direction so that the stator winding groups 135 can be arranged easily and with a high density, and excessive force and bending are not applied, thereby preventing damage to the conductors. Furthermore, since there is no need to form the stator winding groups 135 into a cylindrical shape in advance, the manufacturing of the stator winding groups 135 is facilitated, and in addition, there is no longer any need to adapt cylindrical winding groups to fit into a cylindrical stator core, thereby improving the manufacturing efficiency of the stator.

In the stator of the conventional automotive alternator constructed in this manner, because the stator core 136 can be obtained by bending the parallelepiped laminated body 150 into the cylindrical shape, there has been a problem of the stator core 136 becoming a circular tube which is undulates axially around its entire circumference as shown in FIGS. 38 and 39. Since there are no obstructions outside the laminated body in the circumferential direction, corrections can be made by means of the shaping device when the cylindrical shape is formed, but because the coil ends of the inserted winding groups project around the entire circumference at both axial ends, it has been difficult to correct the laminated body portions.

Furthermore, because the slots 136a and the teeth 136c are formed alternately, that is to say with protrusions and recesses, on an inner circumferential side, there is alternately high and low rigidity in the circumferential direction, and because this type of laminated body is bent into a cylindrical shape, there has also been a problem of deterioration in the shape of slots 136a and teeth 136c. An additional problem has been that warping and undulating has occurred in the core-back portions at the spine portions of the slots 136a, making quality unstable, etc.

SUMMARY OF THE INVENTION

The present invention aims to solve the above problems and an object of the present invention is to provide an automotive alternator in which warping and undulating of the stator core can be reduced and quality can be stabilized at low cost.

In order to achieve the above object, according to one aspect of the present invention, there is provided an automotive alternator including:

a rotor;

a stator disposed facing an outer circumference of the rotor; and a bracket for supporting the rotor and the stator, the automotive alternator further including:

a stator core including a laminated core formed circumferentially with a number of slots extending axially; and a polyphase stator winding installed in the slots at a predetermined slot pitch, the laminated core being formed into an annular shape by:

forming a main laminated body by laminating a number of main lamination plates formed with a number of teeth defining the slots on one side of a yoke;

forming a laminated body by laminating an end plate having higher rigidity than the main lamination plates onto at least one end surface of the main laminated body in a direction of lamination;

disposing the polyphase stator winding in the slots; and placing end portions of the laminated body in contact with each other by bending the laminated body such that opening portions of the slots are on an inner circumferential side.

The laminated body may also be rectilinear in shape prior to bending.

The polyphase stator winding may also include a number of winding sub-portions in each of which a long strand of wire is wound so as to alternately occupy an inner layer and an outer layer in a slot depth direction within the slots at intervals of a predetermined number of slots, the strands of wire folding back outside the slots at axial end surfaces of the stator core to form turn portions; and the turn portions of the strands of wire may also align in a circumferential direction to constitute coil end groups.

The rotor may also include a rotor winding for generating magnetic flux on passage of an electric current and a rotor core covering the rotor winding, a number of claw-shaped magnetic poles being formed in the rotor core by the magnetic flux; and the number of slots in the stator core may also be two or more per phase per pole.

2n strands of the strands of wire may also be disposed in a row in a slot depth direction in each of the slots and the turn portions of the strands of wire arranged so as to align into n rows in a circumferential direction.

2n strands of the strands of wire may also be disposed in a row in a slot depth direction in each of the slots and the turn portions of the strands of wire arranged so as to stack up into n layers.

Interlocking portions may also be disposed in at least the end plate and the main laminated plates facing the end plate so as to connect both together.

The laminated plates and the end plate may also be integrated by being welded together in the direction of lamination at a rear surface portion of the teeth being a surface on the opposite side from the teeth.

Rigidity of the end plate may also be made greater than the main lamination plates by making a thickness of the end plate greater than the main lamination plates.

Rigidity of the end plate may also be made greater than the main laminated plates by providing ribs.

The ribs may also be formed in at least a circumferential direction of the stator.

BRIEF DESCRIPTION OF THE DRAWINGS

FIGS. 9(a) and 9(b) are an end elevation and a plan, respectively, showing an inner-layer wire-strand group constituting part of the stator winding used in the automotive alternator according to Embodiment 1 of the present invention;

DETAILED DESCRIPTION OF THE PREFERRED EMBODIMENTS

Embodiment 1

Figure 1:
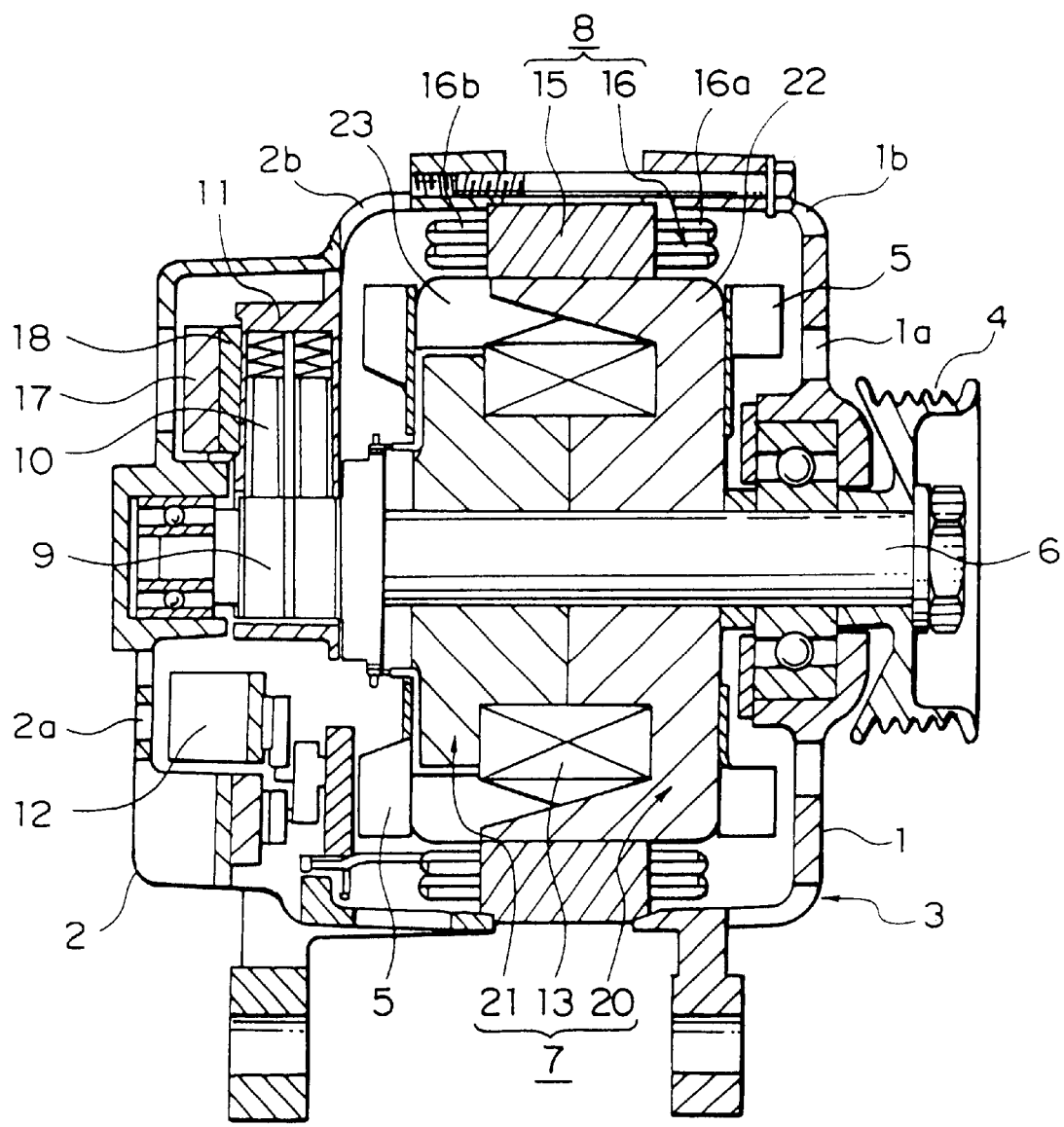
FIG. 1 is a cross section showing a construction of an automotive alternator according to Embodiment 1 of the present invention.
Figure 2:
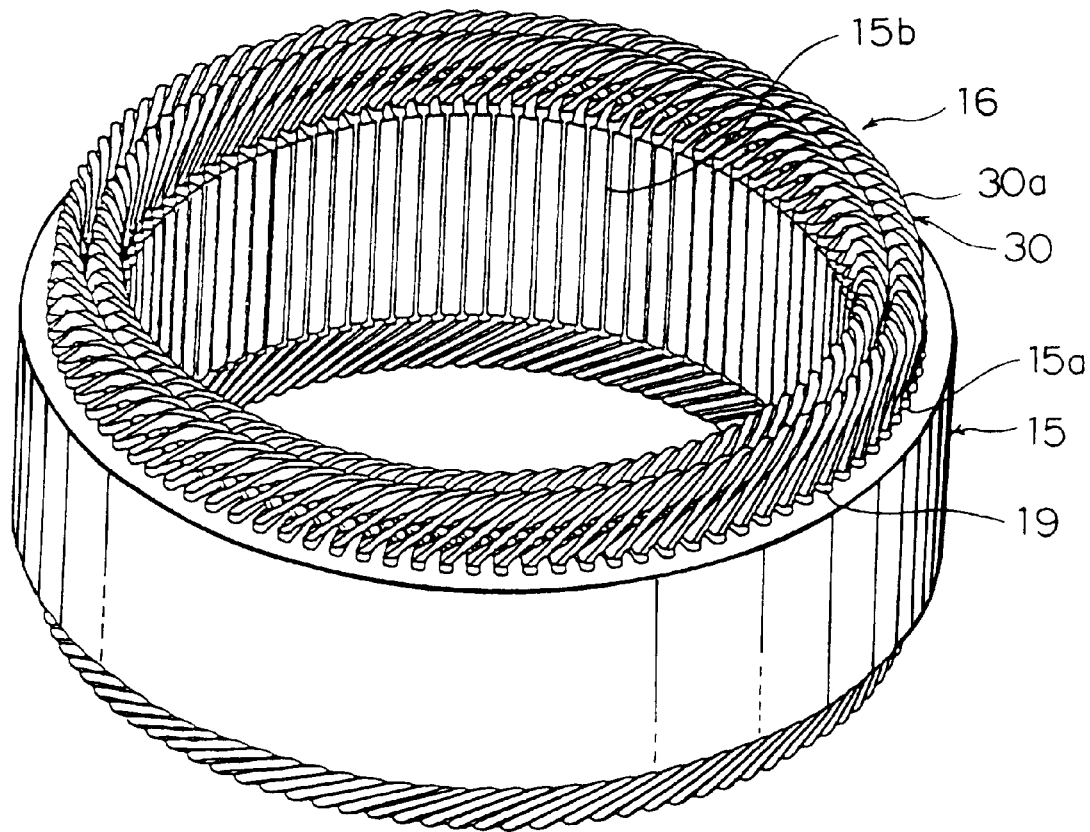
FIG. 2 is a perspective showing a stator of the automotive alternator according to Embodiment 1 of the present invention.
Figure 3:
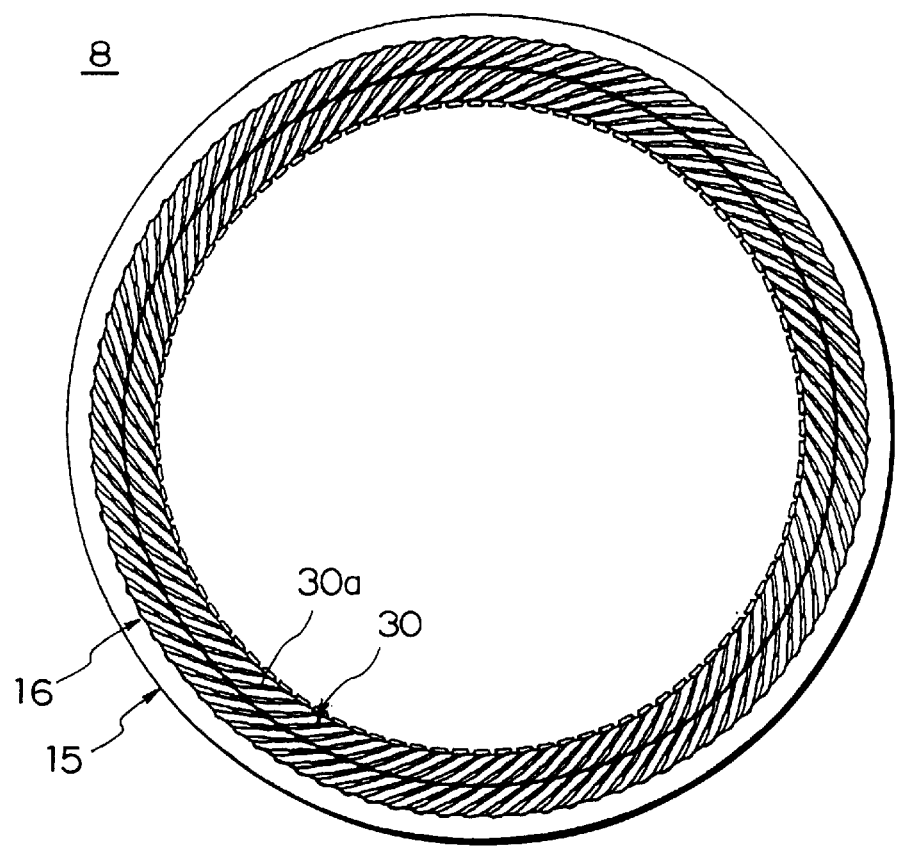
FIG. 3 is an end elevation showing a stator of the automotive alternator according to Embodiment 1 of the present invention.
Figure 4:
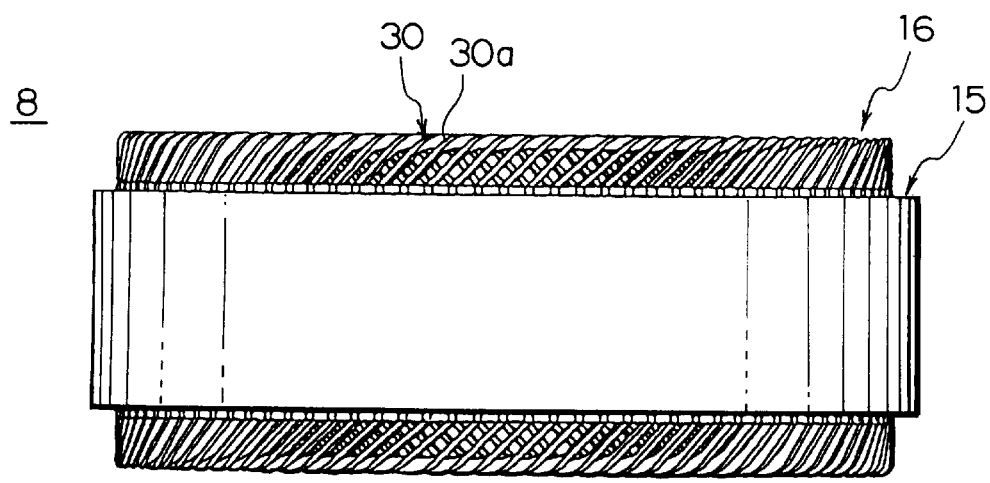
FIG. 4 is a side elevation showing a stator of the automotive alternator according to Embodiment 1 of the present invention.
Figure 5:
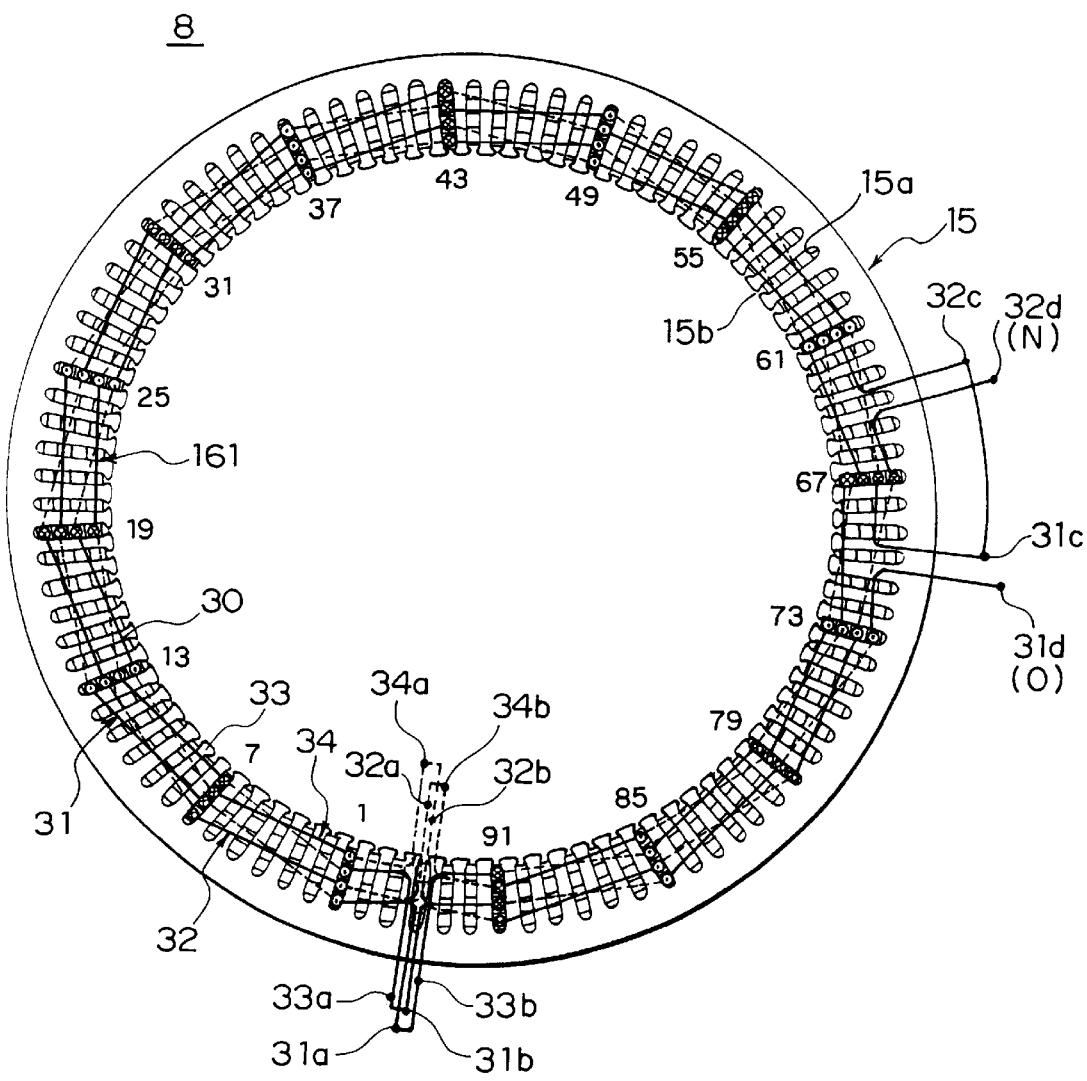
FIG. 5 is an end elevation explaining connections in one stator winding phase portion in the automotive alternator according to Embodiment 1 of the present invention.
Figure 6:
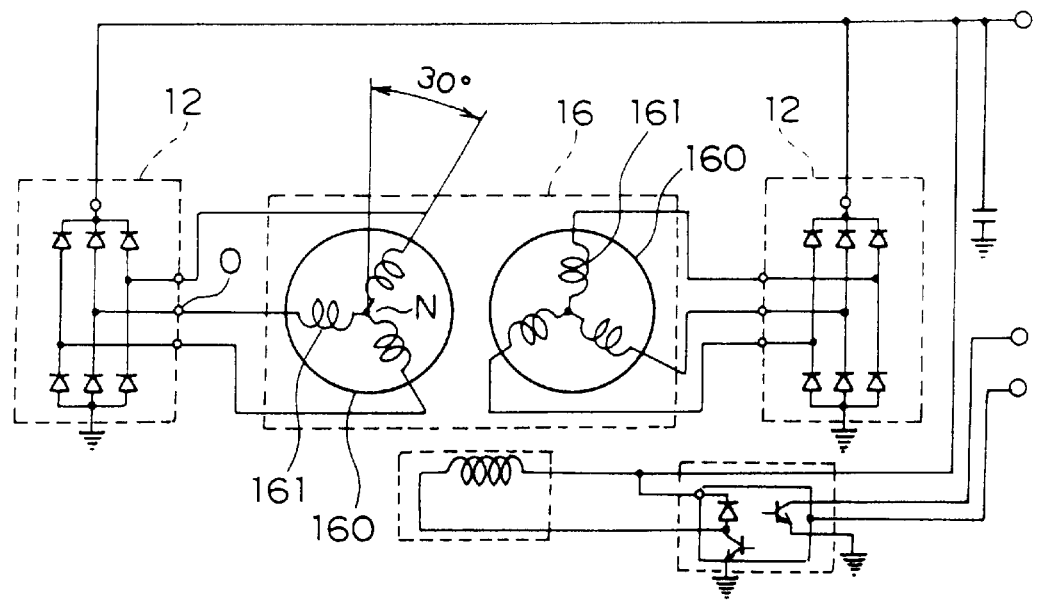
FIG. 6 is a circuit diagram for the automotive alternator according to Embodiment 1 of the present invention.
Figure 7:
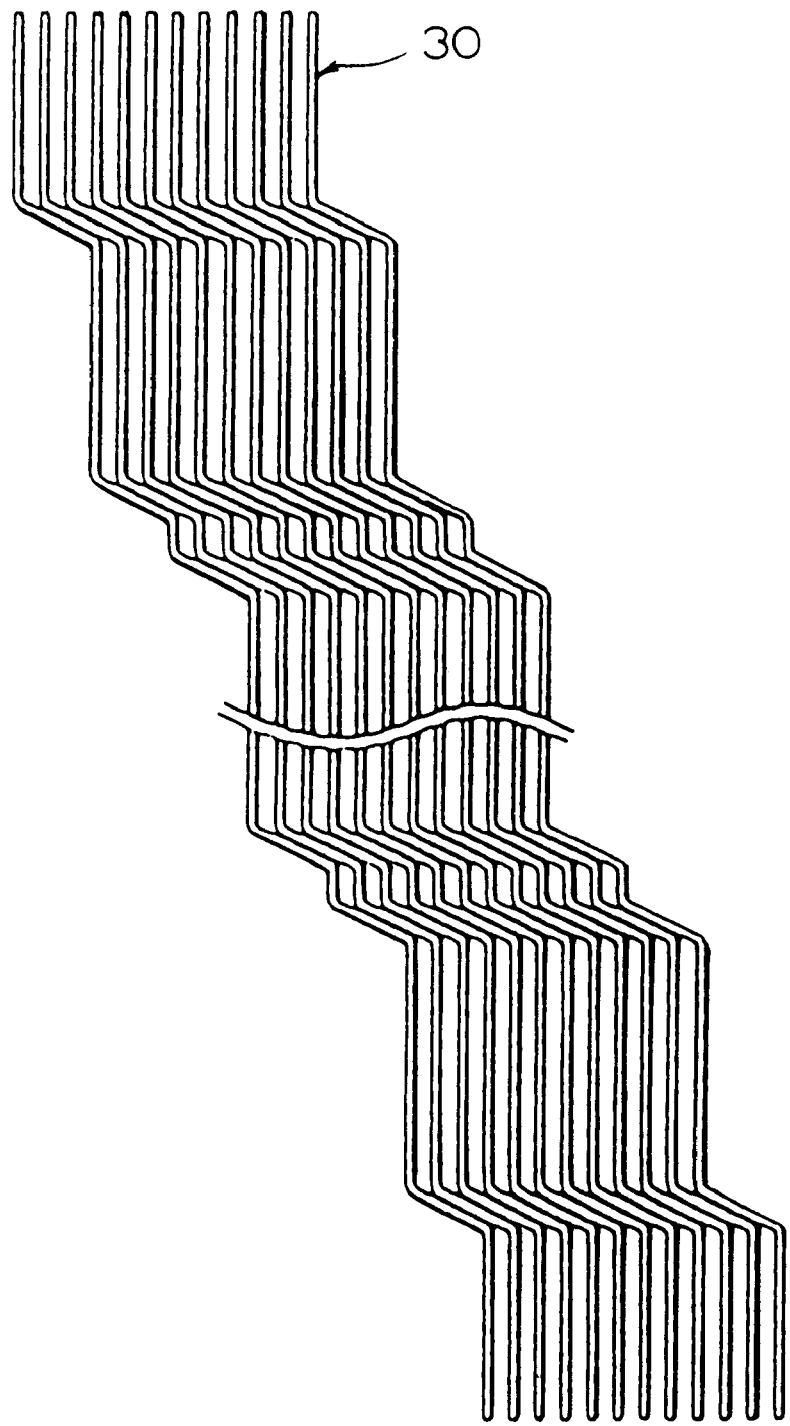
FIG. 7 is a diagram explaining the manufacturing process for winding groups constituting part of the stator winding used in the automotive alternator according to Embodiment 1 of the present invention.
Figure 8:
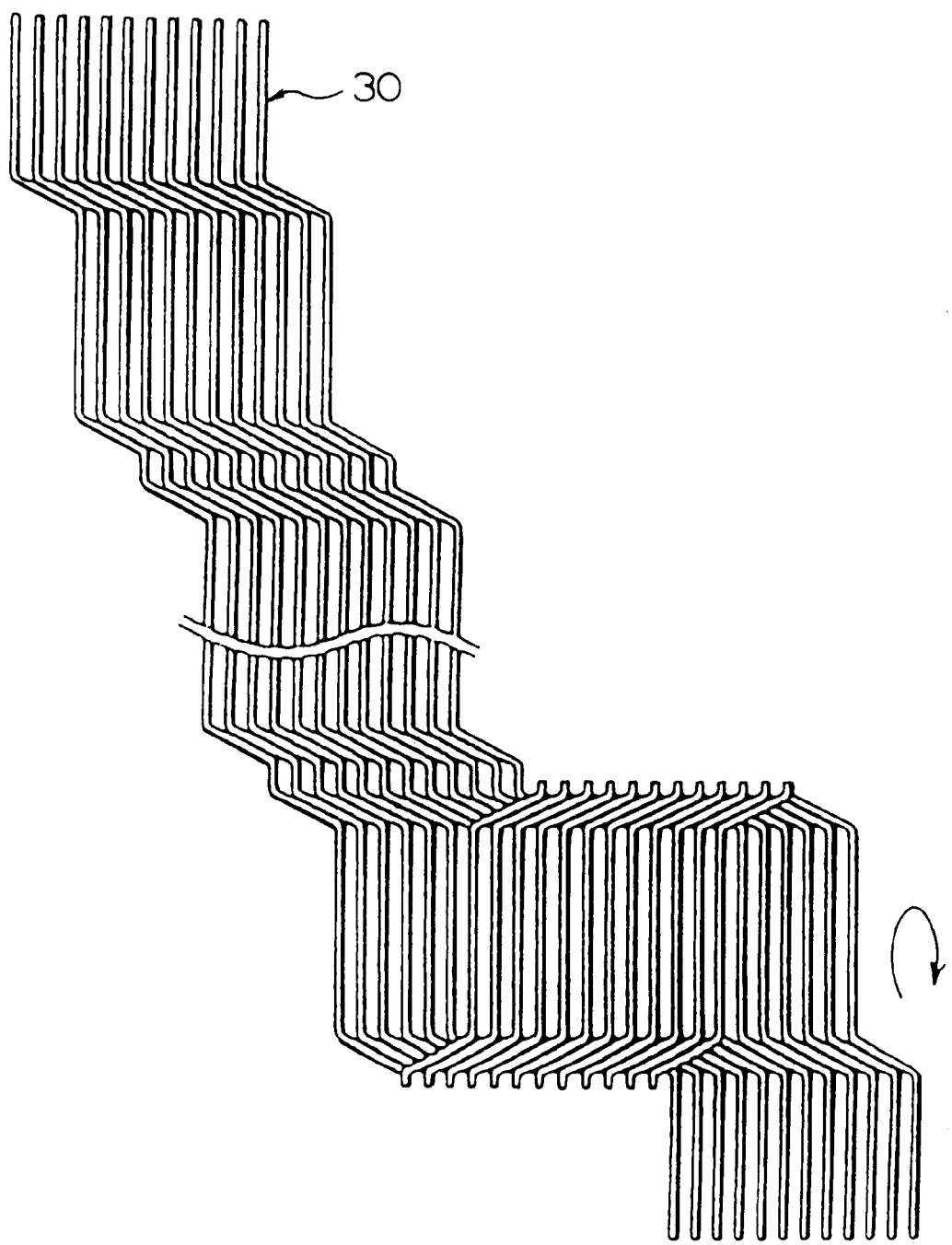
FIG. 8 is a diagram explaining the manufacturing process for winding groups constituting part of the stator winding used in the automotive alternator according to Embodiment 1 of the present invention.
Figures 10A, 10B:
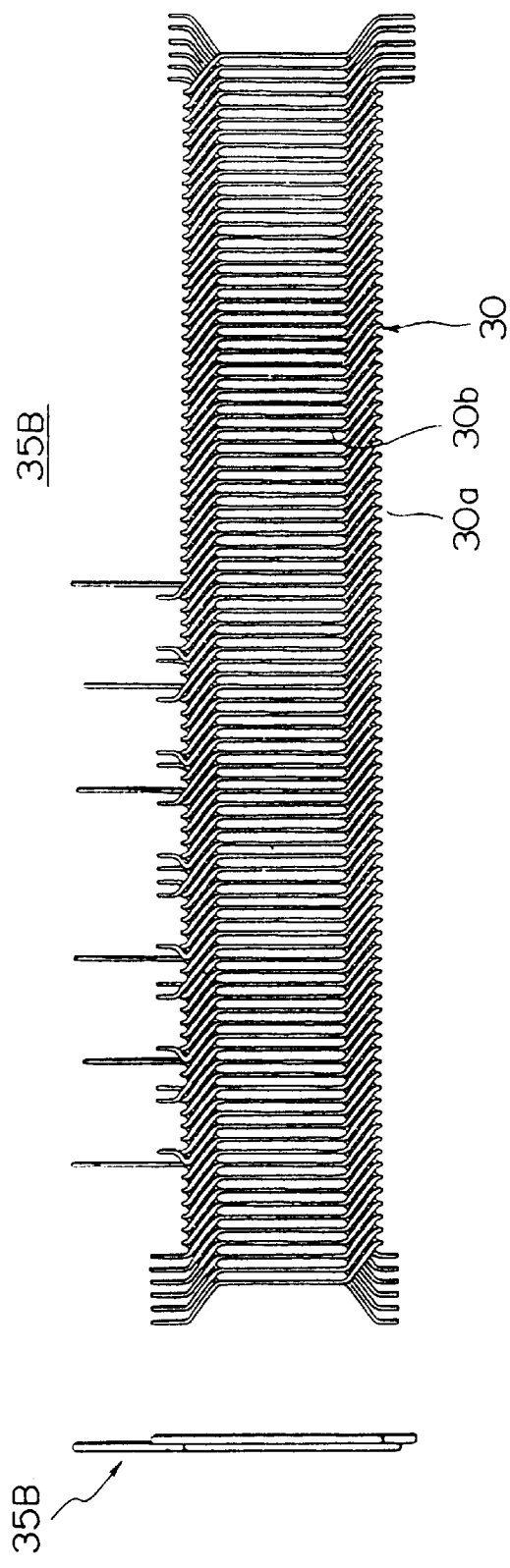
FIGS. 10(a) and 10(b) are an end elevation and a plan, respectively, showing an outer-layer wire-strand group constituting part of the stator winding used in the automotive alternator according to Embodiment 1 of the present invention.
Figure 11:
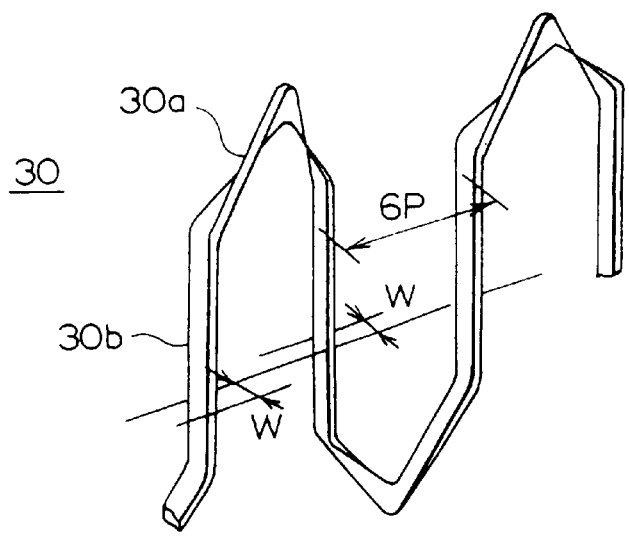
FIG. 11 is a perspective showing part of a strand of wire constituting part of the stator winding used in the automotive alternator according to Embodiment 1 of the present invention.
Figure 12:
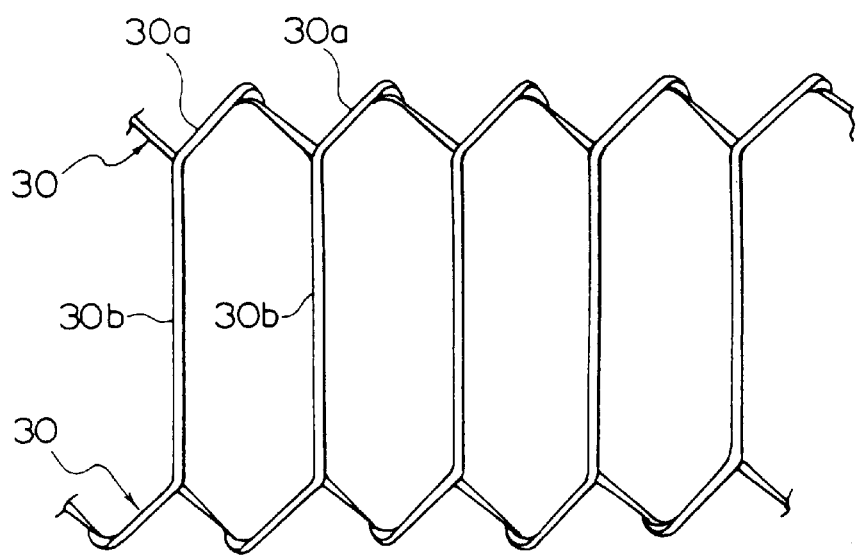
FIG. 12 is a diagram explaining arrangement of the strands of wire constituting part of the stator winding used in the automotive alternator according to Embodiment 1 of the present invention.
Figure 13:
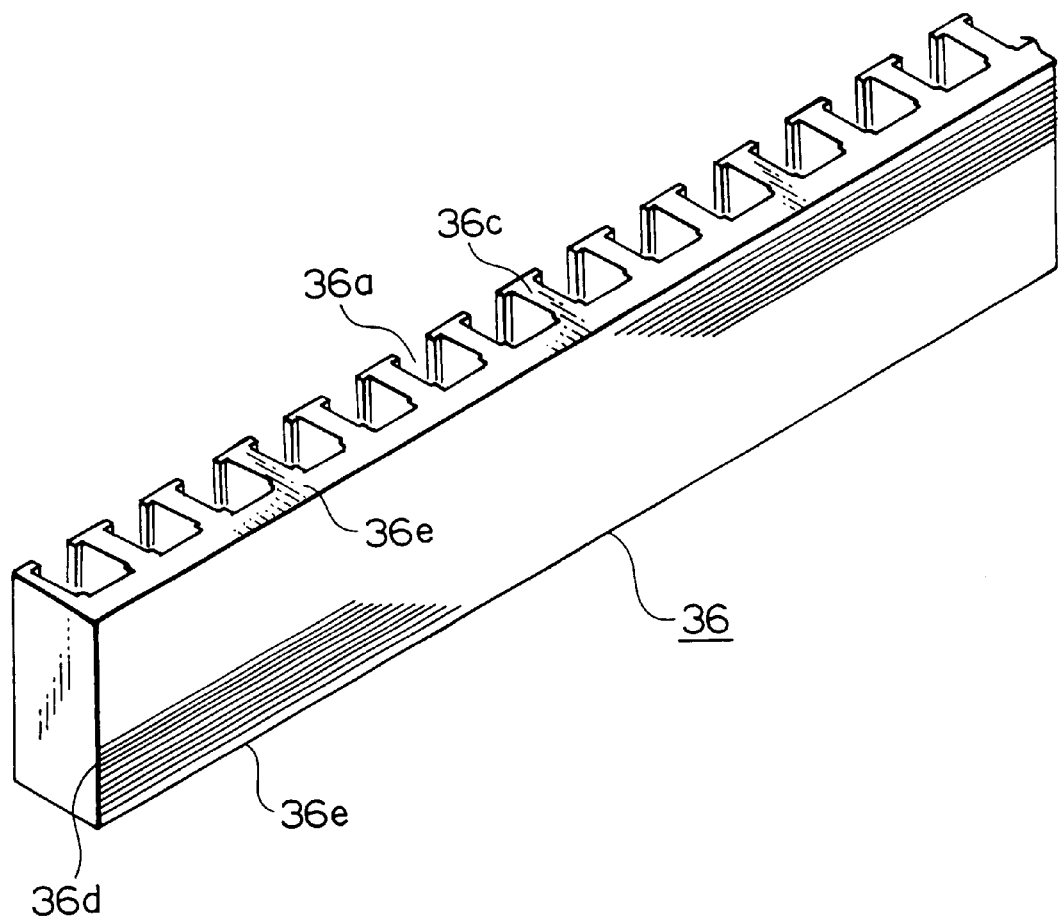
FIG. 13 is a perspective showing the stator core used in the automotive alternator according to Embodiment 1 of the present invention before shaping.
Figure 14:
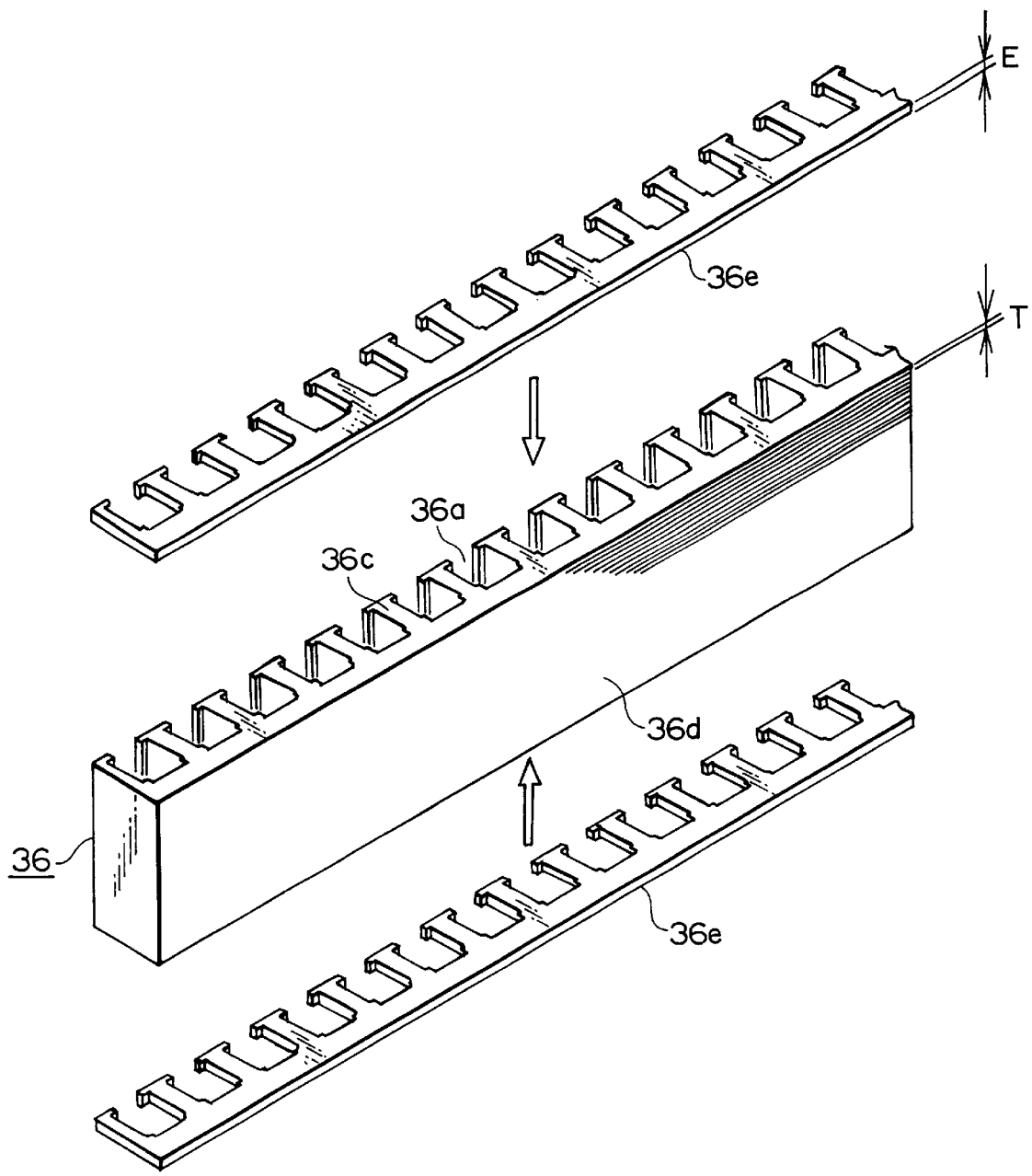
FIG. 14 is a perspective explaining the construction of the stator core shown in FIG. 13.
Figure 15A:
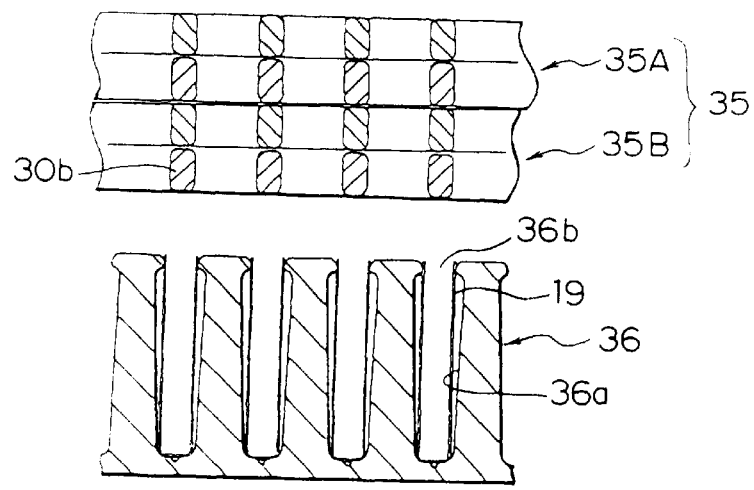
FIGS. 15(a) to 15(c) are cross sections explaining the manufacturing process for the stator used in the automotive alternator according to Embodiment 1 of the present invention.
Figure 15B:
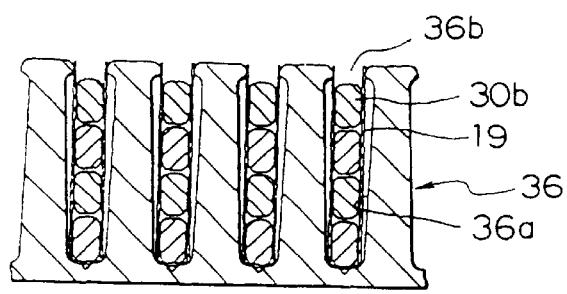
Figure 15C:
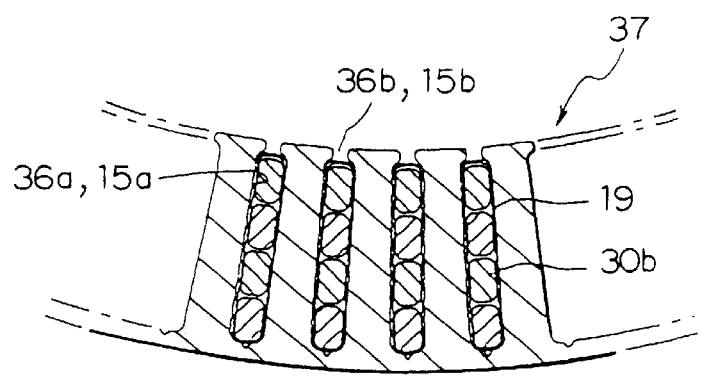
Figure 16:
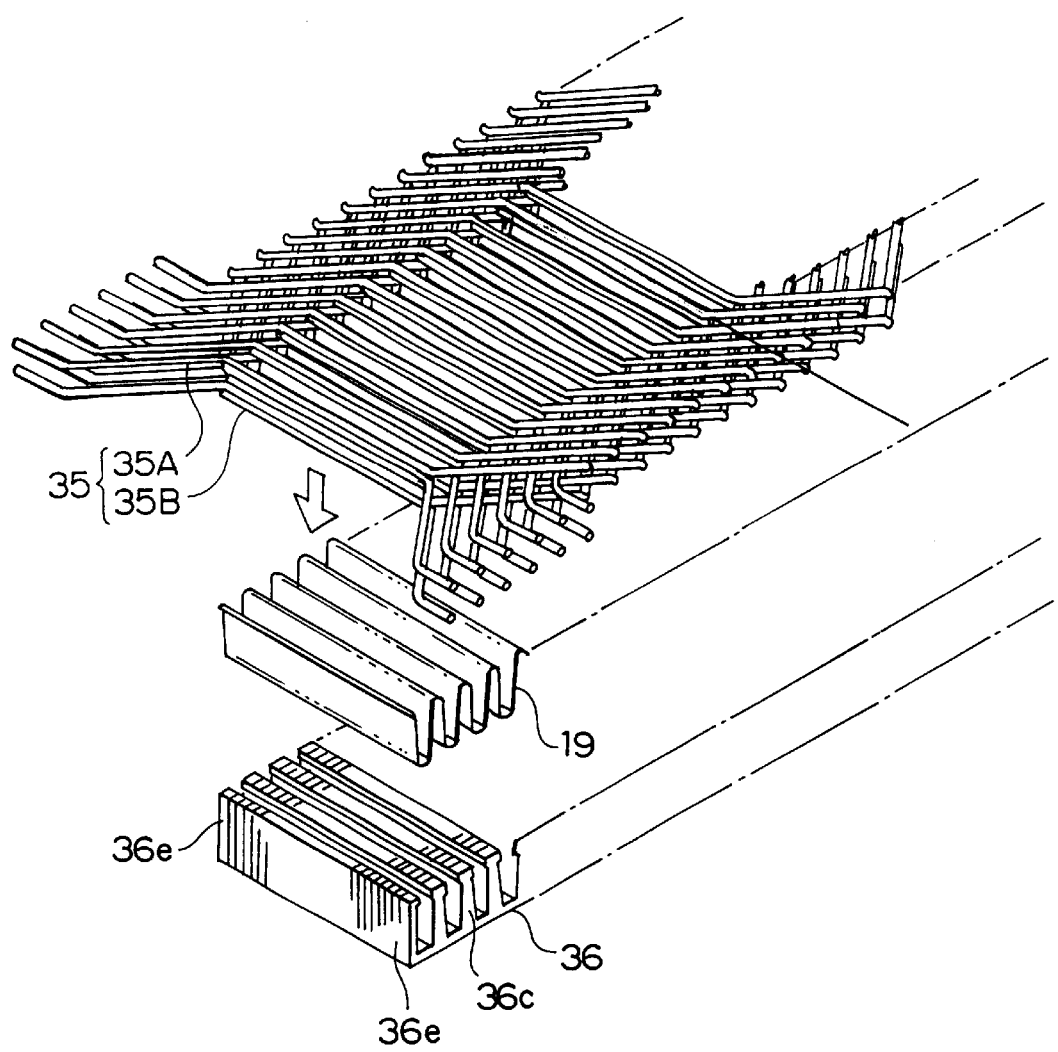
FIG. 16 is a perspective explaining the manufacturing process of the stator used in the automotive alternator according to Embodiment 1 of the present invention.
Figure 17:
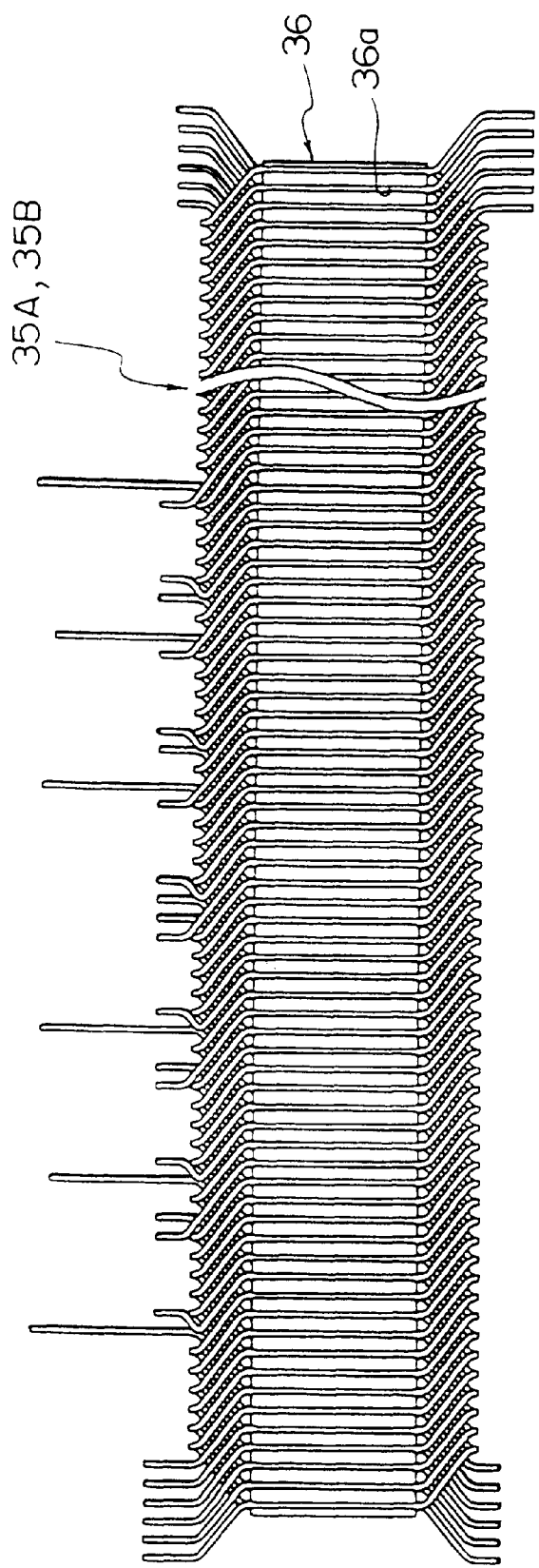
FIG. 17 is a plan showing a wire-strand group constituting part of the stator winding used in this automotive alternator mounted into the core.
Figure 18:
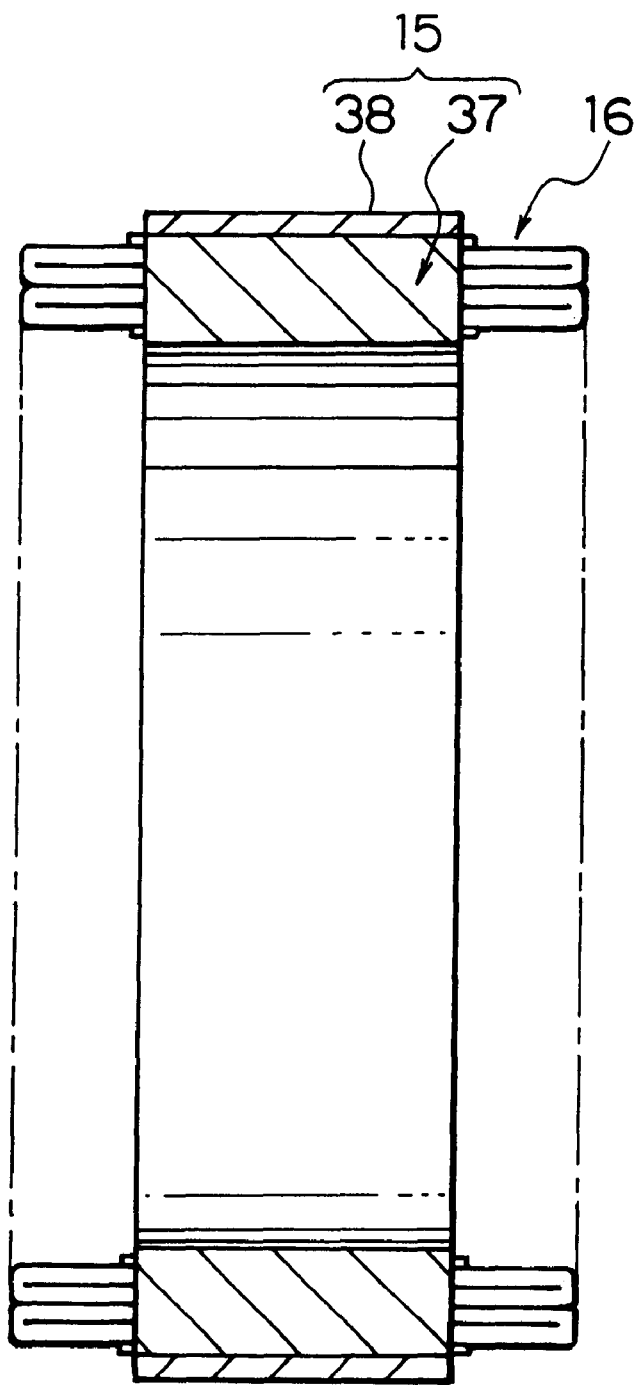
FIG. 18 is a cross section of another stator used in the automotive alternator according to Embodiment 1 of the present invention.

FIG. 1 is a cross section showing a construction of an automotive alternator according to Embodiment 1 of the present invention, FIG. 2 is a perspective showing a stator of the automotive alternator, FIG. 3 is an end elevation showing a stator of the automotive alternator, FIG. 4 is a side elevation showing a stator of the automotive alternator, FIG. 5 is an end elevation explaining connections in one stator winding phase portion in the automotive alternator, FIG. 6 is a circuit diagram for the automotive alternator, FIGS. 7 and 8 are diagrams explaining the manufacturing process for winding groups constituting part of the stator winding used in the automotive alternator. FIG. 9 is a diagram showing an inner-layer wire-strand group constituting part of the stator winding used in the automotive alternator, FIG. 9(a) being an end elevation and FIG. 9(b) being a plan. FIG. 10 is a diagram showing an outer-layer wire-strand group constituting part of the stator winding used in the automotive alternator, FIG. 10(a) being an end elevation and FIG. 10(b) being a plan. FIG. 11 is a perspective showing part of a strand of wire constituting part of the stator winding used in the automotive alternator, FIG. 12 is a diagram explaining arrangement of the strands of wire constituting part of the stator winding used in the automotive alternator. FIG. 13 is a perspective showing the stator core used in the automotive alternator before shaping. FIG. 14 is a perspective explaining the construction of the stator core. FIGS. 15(a) to 15(c) are cross sections explaining the manufacturing process for the stator used in this automotive alternator. FIG. 16 is a perspective explaining the manufacturing process of the stator used in this automotive alternator. FIG. 17 is a plan showing a wire-strand group constituting part of the stator winding used in this automotive alternator mounted into the core. FIG. 18 is a cross section of another stator used in the automotive alternator. Moreover, the output wires and cross-over connections have been omitted from FIG. 2.

In FIG. 1, the automotive alternator is constructed by rotatably mounting a Lundell-type rotor 7 inside a case constructed from an aluminum front bracket 1 and an aluminum rear bracket 2 by means of a shaft 6, and fastening a stator 8 to an inner wall of the case so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt(not shown).

Slip rings 9 for supplying electric current to the rotor 7 are fastened to a second end of the shaft 6, and a pair of brushes 10 are housed in a brush holder 11 disposed inside the case such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. Rectifiers 12 which are electrically connected to the stator 8 and convert alternating current generated in the stator 8 into direct current are mounted inside the case 3.

The rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

Air intake openings 1a and 2a are disposed in axial end surfaces of the front bracket 1 and the rear bracket 2, and air discharge openings 1b and 2b are disposed in two outer circumferential shoulder portions of the front bracket 1 and the rear bracket 2, opposite the radial outside of the front-end and rear-end coil ends 16a and 16b of the stator winding 16.

As shown in FIGS. 2 to 4, the stator 8 includes: a cylindrical stator core 15 composed of a laminated core formed with a number of slots 15a extending axially at a predetermined pitch in a circumferential direction; a polyphase stator winding 16 wound into the stator core 15; and insulators 19 installed in each of the slots 15a for electrically insulating the polyphase stator winding 16 from the stator core 15. The polyphase stator winding 16 includes a number of winding sub-portions in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding portions 160 such that the number of slots housing each phase of the winding portions corresponds to the number of magnetic poles (sixteen) in the rotor 7. Long, insulated copper wire material having a rectangular cross section, for example, is used in the strands of wire 30.

Next, the winding construction of one stator winding phase portion 161 will be explained in detail with reference to FIGS. 5 and 6.

One stator winding phase portion 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding subportion 31 extending outwards from slot number 91 are joined to form two turns of winding.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one stator winding phase portion 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a crossover connection connecting portion, and a second cut end 31d of the first winding sub-portion 31 and a second cut end 32d of the second winding sub-portion 32 become an output wire (O) and a neutral-point (N), respectively.

A total of six stator winding phase portions 161 are similarly formed by offsetting the slots 15a into which the strands of wire 30 are wound by one slot at a time. Then, as shown in FIG. 6, three stator winding phase portions 161 each are connected into star connections to form the two sets of three-phase stator winding portions 160, and each of the three-phase stator winding portions 160 is connected to its own rectifier 12. The rectifiers 12 are connected in parallel so that the direct-current output from each is combined.

Thus, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is also wound so as to alternately occupy the inner layer and the outer layer relative to the slot depth direction (the radial direction) in every sixth slot. Turn portions 30a of the strands of wire 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form coil end groups 16a and 16b.

Next, the assembly of the stator 8 will be explained with reference to FIGS. 7 to 18.

First, as shown in FIG. 7, twelve long strands of wire 30 are simultaneously bent in the same plane to form a lightning-bolt shape. Then, a wire-strand group 35A, shown in FIG. 9, is prepared by progressively folding the strand at right angles, as indicated by the arrow in FIG. 8, using a jig. In addition, a wire-strand group 35B including crossover connections and output wires, as shown in FIG. 10, is prepared in a similar manner. The wire-strand groups 35A and 35B are then annealed for ten minutes at 300° so that a parallelepiped core 36 mounted with the wire-strand groups 35A and 35B can be easily formed into an annular shape.

Moreover, as shown in FIG. 11, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 12. Six end portions of the strands of wire 30 each extend outwards from first and second sides at first and second ends of the wire-strand groups 35A and 35B. Furthermore, the turn portions 30a are arranged so as to line up in rows on first and second side portions of the wire-strand groups 35A and 35B.

At the same time, a generally parallelepiped laminated core 36 is prepared as shown in FIG. 13 by laminating a predetermined number of main lamination plates 36d prepared from SPCC material formed with trapezoidal slots 36a and teeth 36c at a predetermined pitch (an electrical angle of 30°) and additionally laser welding an outer portion thereof at a predetermined position in a direction of lamination.

In the laminated core 36, as shown in FIG. 14, end plates 36e having greater rigidity than the main lamination plates 36d is additionally laminated onto both end surfaces in a direction of lamination on the predetermined number of laminated main lamination plates 36d. Rigidity of the end plates 36e is improved by preparing the end plates 36e from the same SPCC material as the main lamination plates 36d, giving the end plates 36e the same general shape as the main lamination plates 36d, and increasing a thickness of the end plates (given by thickness E) so as to be greater than a thickness T of the main lamination plates 36d. Then, the number of main lamination plates 36d in this embodiment of the present invention is reduced compared to the conventional example so that the thickness of the parallelepiped laminated core 36 becomes the same as that of the conventional example.

As shown in FIGS. 15(a) and 16, the insulators 19 are mounted in the slots 36a of the parallelepiped core 36, and the straight portions of the two wire-strand groups 35A and 35B are inserted so as to stack up within each of the slots. In this manner, the two wire-strand groups 35A and 35B are installed in the parallelepiped core 36 as shown in FIG.

15(*b*). At this time, straight portions 30*b* of the strands of wire 30 are housed in lines of four in a radial direction within the slots 36*a* and are electrically insulated from the parallelepiped core 36 by the insulators 19. The two wire-strand groups 35A and 35B are stacked one on top of the other when installed in the parallelepiped core 36 as shown in FIG. 17.

Next, the parallelepiped core 36 is rolled up and its ends abutted and welded to each other to obtain a cylindrical core 37, as shown in FIG. 15(*c*). By rolling up the parallelepiped core 36, the slots 36*a* (corresponding to the slots 15*a* in the stator core) take on a generally rectangular cross-sectional shape, and opening portions 36*b* of the slots 36*a* (corresponding to opening portions 15*b* of the slots 15*a*) become smaller than the slot-width dimensions of the straight portions 30*b*. Then, the end portions of each of the strands of wire 30 are connected to each other based on the connections shown in FIG. 3 to form a stator winding group 161. Thereafter, as for other embodiments, the cylindrical core 37 is inserted into a cylindrical outer core 38 composed of laminated SPCC material and integrated by shrink fitting to obtain the stator 8 shown in FIG. 18. The integrated body consisting of the cylindrical core 37 and the outer core 38 corresponds to the stator core 15.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, external air is drawn in through the air intake openings 2*a* disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16*b* of the polyphase stator winding 16 before being expelled to the outside through the air discharge openings 2*b*. At the same time, at the front end, external air is drawn in axially through the air intake openings 1*a* by rotation of the fans 5, and is then deflected centrifugally by the fans 5, cooling the front-end coil end group 16*a* of the polyphase stator winding 16 before being expelled to the outside through the air discharge openings 1*b*.

Thus, according to Embodiment 1 of the present invention, because the rigidity in the direction of lamination is improved by the end plate 36*e*, deformation of the stator core 36 such as undulations can be reduced when the generally parallelepiped laminated core 36 is rolled up to obtain the cylindrical core 37. Furthermore, the pressing force in the direction of lamination is high, gaps can be prevented from opening up between the main lamination plates 36*d* and the end plates 36*e*. Thus, a product with stable quality can be obtained at low cost.

Figure 19:
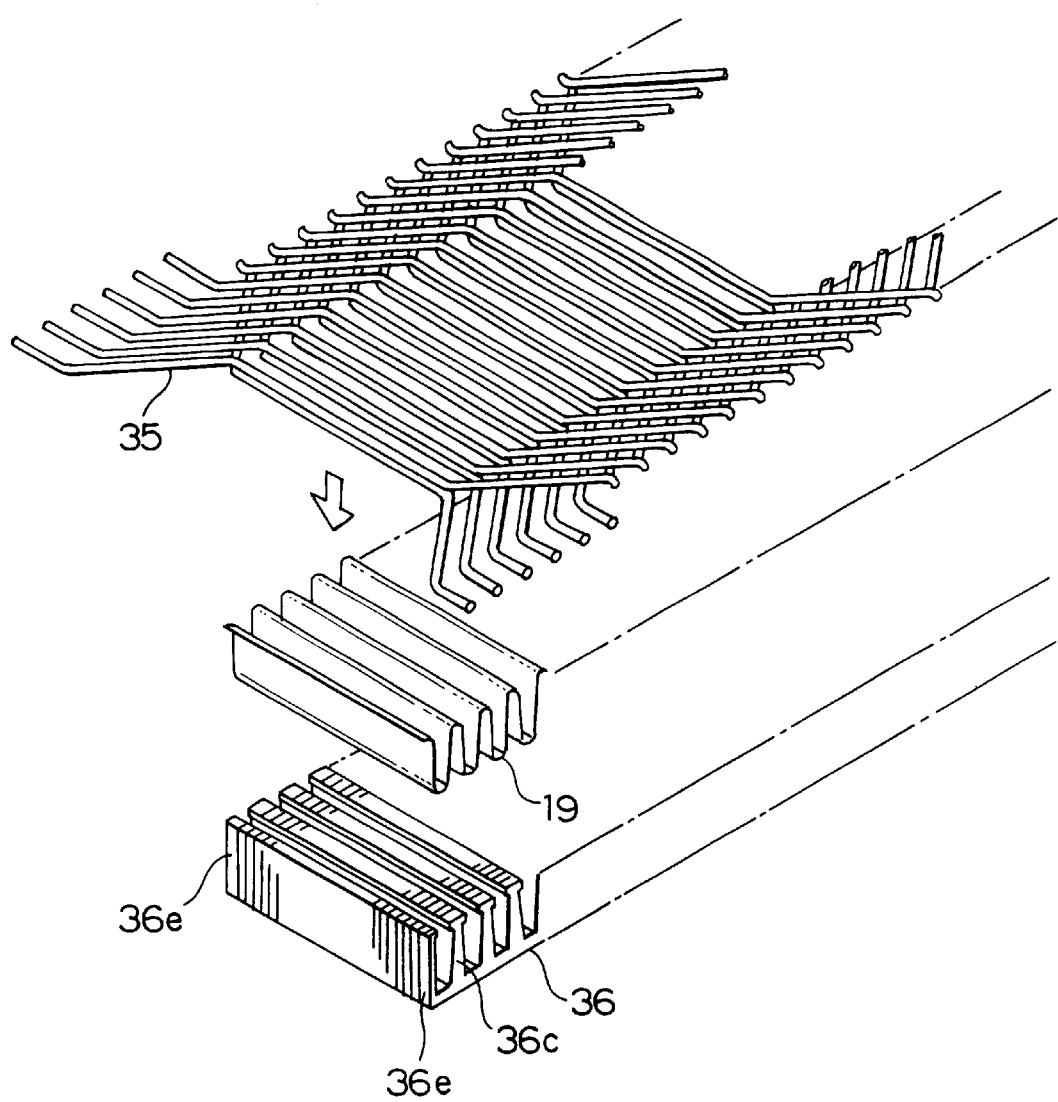
FIG. 19 is a perspective explaining the manufacturing process for another stator used in the automotive alternator according to Embodiment 1 of the present invention.

Moreover, in this embodiment of the present invention, the wire-strand group 35 is constituted by the two wire-strand groups 35A and 35B, but as shown in FIG. 19, the same effect can be obtained even if the wire-strand group 35 is singular (constituted by one layer) by providing the end plates 36*e*.

Furthermore, in this embodiment, the cylindrical core is obtained by rolling up the rectilinear laminated core 36, but the laminated core 36 is not necessarily limited to a rectilinear shape, and the effects as the highly-rigid end plates can be obtained if the laminated body is formed by laminating a number of main lamination plates, and the same effects can be obtained by preparing an number of plates having a large curvature, for example, and assembling and connecting the plates while reducing the radius of curvature.

Furthermore, four strands of wire 30 are arranged so as to line up in a row radially within each slot 15*a*, and the turn portions 30*a* are arranged to line up in two rows circumferentially. Thus, the turn portions 30*a* constituting the coil end groups 16*a* and 16*b* are each divided into two rows radially, enabling the height to which the coil end groups 16*a* and 16*b* extend outwards from the stator core 15 to be reduced. As a result, wind resistance in the coil end groups 16*a* and 16*b* is reduced, enabling the reduction of wind noise due to the rotation of the rotor 7.

The turn portions 30*a* which fold back at the end surfaces of the stator core 15 each connect two straight portions 30*b* disposed in different layers in different slots 15*a* six slots apart. Thus, because interference between the coil ends in each phase is suppressed and the space factor of the stator winding is increased, increased output can be achieved. Furthermore, each of the turn portions 30*a* can be easily formed into the same general shape. Because circumferential irregularities in radially inner edge surfaces of the coil end groups 16*a* and 16*b* can be suppressed by forming each of the turn portions 30*a* into the same general shape, that is, by forming the turn portions 30*a* which constitute the coil end groups 16*a* and 16*b* into the same general shape circumferentially, wind noise generated between the rotor 7 and the coil end groups 16*a* and 16*b* can be reduced. Furthermore, leak inductance becomes uniform, stabilizing output. Furthermore, because the turn portions 30*a* are spaced in the circumferential direction, and the spaces between the turn portions 30*a* in the circumferential direction are formed generally the same, the passage of cooling air inside the coil end groups 16*a* and 16*b* is facilitated, improving cooling and reducing noise due to interference between the cooling air and the coil ends.

Because the turn portions 30*a* are formed with the same general shape and arranged in rows in the circumferential direction, heat dissipation from each of the turn portions 30*a* is even, and in addition, heat dissipation from each of the coil end groups 16*a* and 16*b* is also even. Thus, heat generated in the polyphase stator winding 16 is radiated uniformly from each of the turn portions 30*a* and radiated uniformly from both coil end groups 16*a* and 16*b*, improving the cooling of the polyphase stator winding 16.

Because the open dimensions of the opening portions 15*b* of the slots 15*a* are constructed so as to be smaller than the dimensions of the strands of wire 30 in the width direction of the slots 15*a*, the strands of wire 30 are prevented from popping out of the slots 15*a* towards the radial inside and noise at the opening portions 15*b* due to interference with the rotor 7 can be reduced.

Because the straight portions 30*b* are formed with a rectangular cross section, the cross-sectional shape of the straight portions 30*b* fits neatly into the shape of the slots 15*a* when the straight portions 30*b* are housed inside the slots 15*a*. Thus, the space factor of the strands of wire 30 inside the slots 15*a* is easily increased, enabling improved transfer of heat from the strands of wire 30 to the stator core 15. Here in Embodiment 1, the straight portions 30*b* are formed into a rectangular cross section, but the cross-sectional shape of the straight portions 30*b* may be any generally rectangular shape which fits neatly into the generally rectangular shape of the slots. This generally rectangular shape is not limited to a true rectangular shape and may be a square shape, a shape consisting of four flat surfaces and rounded corners, or an elongated elliptical shape in which the short sides of the rectangle are made into arcs, etc.

Because the strands of wire 30 are formed with a rectangular cross section, the surface area radiating heat from the turn portions 30*a* constituting the coil ends is increased, efficiently radiating heat generated by the polyphase stator winding 16. In addition, by disposing the long sides of the rectangular cross section parallel to the radial direction, gaps can be ensured between the turn portions 30*b*, making it possible for the cooling air to pass inside the coil end groups 16*a* and 16*b* and reducing wind resistance in the radial direction.

As shown in FIG. 6, two sets of three-phase stator winding portions 160 are constructed by forming into two star connections three stator winding groups 161 each constructed by connecting the first to fourth winding subportions 31 to 34 in series, each of these two sets of three-phase stator winding portions 160 is connected to its own rectifier 12, and in addition, the outputs from the two rectifiers 12 are connected in parallel. Thus, the direct current outputs of the three-phase stator winding portions 160 which have four turns each can be combined and extracted, eliminating power generation deficiency in low rotational frequency regions.

Increases in the number of turns in the polyphase stator winding can be easily adapted for by lining up the straight portions 30*b* of the wire-strand group 35 (35A and 35B) which are composed of continuous strands of wire and installing them so that they stack up on top of each other.

The stator 8 according to Embodiment 1 can be prepared by inserting the wire-strand group 35 which is composed of continuous wire into the slots 36*a* in the parallelepiped core 36 through the opening portions 36*b* and then rolling the parallelepiped core 36 into an annular shape. Thus, because the open dimensions of the opening portions 36*b* of the slots 36*a* can be made larger than the dimensions of the strands of wire 30 in the width direction of the slots, the operation of inserting the wire-strand group 35 is improved. Furthermore, because the open dimensions of the opening portions 36*b* of the parallelepiped core 36 can be made smaller than the dimensions of the strands of wire 30 in the width direction of the slots when the parallelepiped core 36 is rolled up, the space factor is increased, enabling output to be improved. In addition, even if the number of slots is increased, the productivity of the stator will not deteriorate.

Because the height of the coil end groups 16*a* and 16*b* is low and there are not many joint portions, noise caused by interference between the coil end groups 16*a* and 16*b* and the cooling air flow formed by the fans 5 due to rotation of the rotor 7 is reduced. Because the shape of both coil end groups 16*a* and 16*b* is generally the same and the fans 5 are disposed on both ends of the rotor 7, the coil end groups 16*a* and 16*b* are cooled in a balanced manner, reducing the temperature of the stator winding uniformly and greatly.

Now, the fans 5 do not have to be disposed on both ends of the rotor 7, they may be disposed in consideration of the stator winding or the positions of the rectifiers which are large heat-generating bodies. For example, the coil ends of the stator winding which are large heat generating bodies can be disposed on the discharge side of a fan with a large cooling speed, and a fan disposed on an end portion of the rotor at the end where the rectifiers are disposed. Furthermore, when mounted to an automotive engine, because the pulley is normally connected to a crankshaft by means of a belt, the fan may be disposed at the end away from the pulley so that the cooling exhaust from the fan does not affect the belt. Moreover, shoulder portions of the claw-shaped magnetic poles of the rotor have a wind conveying action, and can be used as a cooling means.

Because the direction of inclination of the strands of wire 30 constituting the inner circumferential side of the coil end group 16*a* is parallel to the direction of inclination of the strands of wire 30 constituting the inner circumferential side of the coil end group 16*b*, axial flow of cooling air through the case 3 turns along the direction of inclination of the strands of wire 30. Thus, the axial flow of the cooling air flow generated by the rotation of the rotor 7 is controlled.

In other words, if the strands of wire 30 constituting the inner circumferential side of the coil end groups 16*a* and 16*b* are inclined along the direction resulting from the combination of a component of the cooling air flow in a direction of rotation of the rotor 7 and a component of the axial flow of the cooling air, axial flow of the cooling air is promoted. Thus, because the rotor coil 13 is efficiently cooled, the temperature of the rotor coil 13 decreases, enabling the field current to be increased and output improved. In that case, because the strands of wire 30 constituting the inner circumferential side of the coil end groups 16*a* and 16*b* are inclined along the component of the axial flow of cooling air, wind noise due to interference is also reduced.

On the other hand, if the strands of wire 30 constituting the inner circumferential side of the coil end groups 16*a* and 16*b* are inclined along the direction resulting from the combination of a component of the cooling air flow in a direction of rotation of the rotor 7 and a component against the axial flow of the cooling air, axial flow of the cooling air is reduced. Thus, the amount of air discharged radially is increased, improving the cooling of the coil ends disposed on the discharge side.

Because the axial length of the stator 8, including the coil ends, is shorter than the pole cores 20 and 21, compactness can be achieved. When fans 5 are disposed on both end portions of the rotor 7, because there are no coil ends on the discharge side of the fans, wind resistance is significantly reduced, thereby reducing wind noise, and suppressing temperature increases in internal parts requiring cooling, such as the rectifiers 12.

The number of slots housing the polyphase stator winding 16 is two per pole per phase, and there are two three-phase stator winding portions 160 each corresponding to the number of slots per pole per phase. Thus, the magnetomotive wave form can be made to approximate a sinusoidal wave, reducing higher harmonic wave components and ensuring stable output. Because the number of slots 15*a* is increased, teeth in the stator core 15 are slender, reducing magnetic leakage through teeth straddling the facing claw-shaped magnetic poles 22 and 23, enabling surges in output to be suppressed. Furthermore, because a greater number of slots 15*a* means a correspondingly greater number of turn portions 30*a*, heat dissipation from the coil end groups is improved.

Because the slots 15*a* and the opening portions 15*b* are arranged to be evenly spaced at an electrical angle of 30°, magnetic surges which result in excitation forces which cause magnetic noise can be reduced.

Embodiment 2

Figure 20:
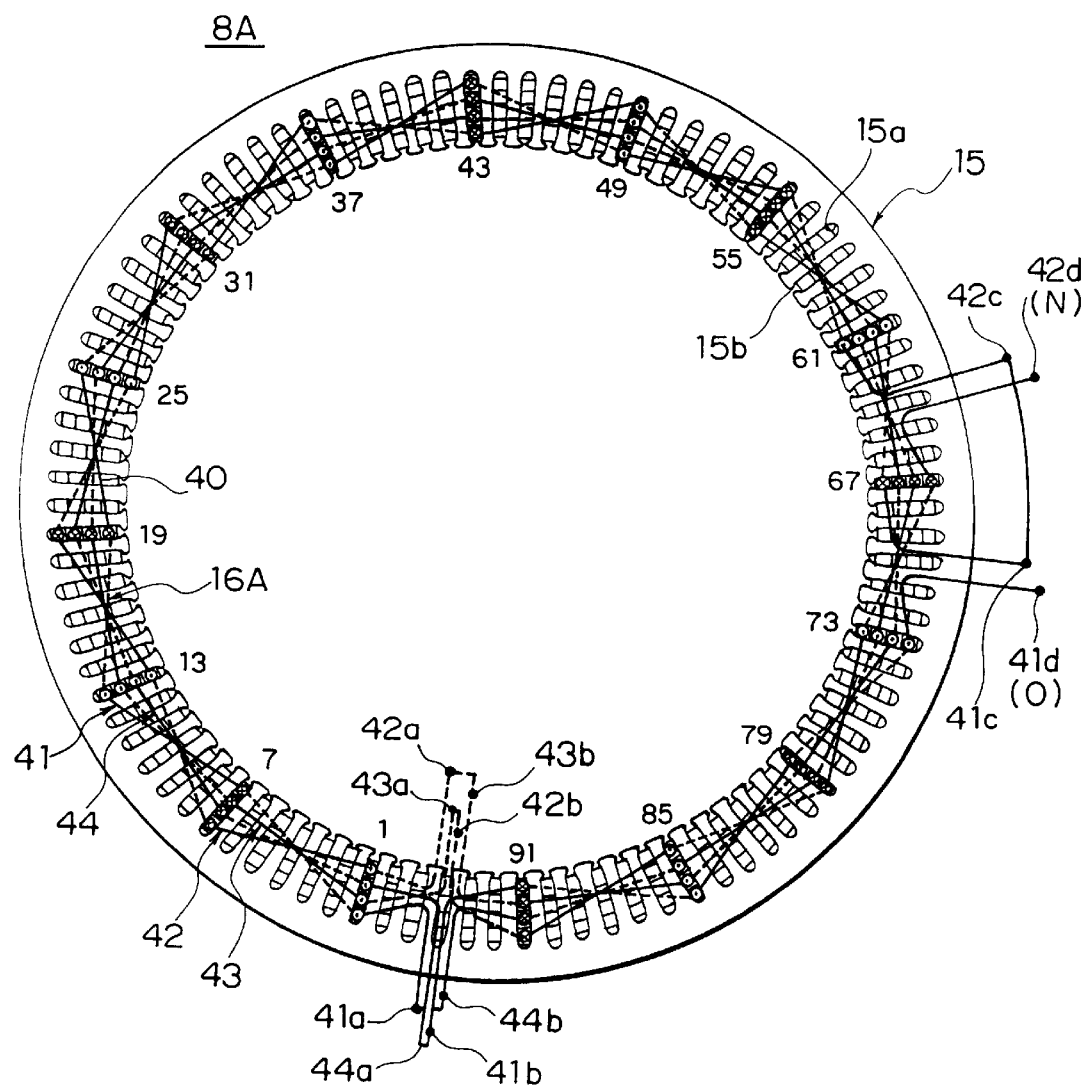
FIG. 20 is an end elevation explaining connections in one stator winding phase portion in the automotive alternator according to Embodiment 2 of the present invention.

FIG. 20 is an end elevation explaining connections in one stator winding phase portion in the automotive alternator according to Embodiment 2 of the present invention.

In FIG. 20, one stator winding phase portion 161A is constituted by first to fourth winding sub-portions 41 to 44 each composed of one strand of wire 40. Insulated copper wire material having a rectangular cross section, for example, is used in the strands of wire 40.

The first winding sub-portion 41 is formed by wave winding one strand of wire 40 into every sixth slot from slot numbers 1 to 91 so as to alternately occupy a first position from an outer circumferential side and a fourth position from the outer circumferential side inside the slots 15a. The second winding sub-portion 42 is formed by wave winding a strand of wire 40 into every sixth slot from slot numbers 1 to 91 so as to alternately occupy the fourth position from the outer circumferential side and the first position from the outer circumferential side inside the slots 15a. The third winding sub-portion 43 is formed by wave winding a strand of wire 40 into every sixth slot from slot numbers 1 to 91 so as to alternately occupy a second position from the outer circumferential side and a third position from the outer circumferential side inside the slots 15a. The fourth winding sub-portion 42 is formed by wave winding a strand of wire 40 into every sixth slot from slot numbers 1 to 91 so as to alternately occupy the third position from the outer circumferential side and the second position from the outer circumferential side inside the slots 15a. The strands of wire 40 are arranged to line up in a row of four strands within each slot 15a with the longitudinal direction of their rectangular cross sections aligned in a radial direction.

At a first end of the stator core 15, a first end portion 41a of the first winding sub-portion 41 extending outwards from slot number 1 and a second end portion 44b of the fourth winding sub-portion 44 extending outwards from slot number 91 are joined, and in addition, a first end portion 44a of the fourth winding sub-portion 44 extending outwards from slot number 1 and a second end portion 41b of the first winding subportion 41 extending outwards from slot number 91 are joined to form two turns of winding.

At a second end of the stator core 15, a first end portion 42a of the second winding sub-portion 42 extending outwards from slot number 1 and a second end portion 43b of the third winding sub-portion 43 extending outwards from slot number 91 are joined, and in addition, a first end portion 43a of the third winding sub-portion 43 extending outwards from slot number 1 and a second end portion 42b of the second winding sub-portion 42 extending outwards from slot number 91 are joined to form two turns of winding.

In addition, a portion of the strand of wire 40 of the second winding sub-portion 42 extending outwards at the first end of the stator core 15 from slot numbers 61 and 67 is cut, and a portion of the strand of wire 40 of the first winding sub-portion 41 extending outwards at the first end of the stator core 15 from slot numbers 67 and 73 is also cut. A first cut end 41c of the first winding sub-portion 41 and a first cut end 42c of the second winding sub-portion 42 are joined to form one stator winding phase portion 161A having four turns connecting the first to fourth winding sub-portions 41 to 44 in series.

Moreover, the joint portion between the first cut end 41c of the first winding sub-portion 41 and the first cut end 42c of the second winding sub-portion 42 becomes a crossover connection connecting portion, a second cut end 41d of the first winding sub-portion 41 and a second cut end 42d of the second winding sub-portion 42 become an output wire (O) and a neutral-point (N), respectively.

A total of six stator winding phase portion 161A are similarly formed by offsetting the slots 15a into which the strands of wire 40 are wound one slot at a time. Then, as in Embodiment 1 above, three stator winding phase portions 161A each are connected into star connections to form the two sets of three-phase stator winding portions, and each of the three-phase stator winding portions is connected to its own rectifier 12. The rectifiers 12 are connected in parallel so that the direct-current output from each is combined.

Next, the assembly of a stator 8A will be explained with reference to FIGS. 19 to 26.

Figure 21:
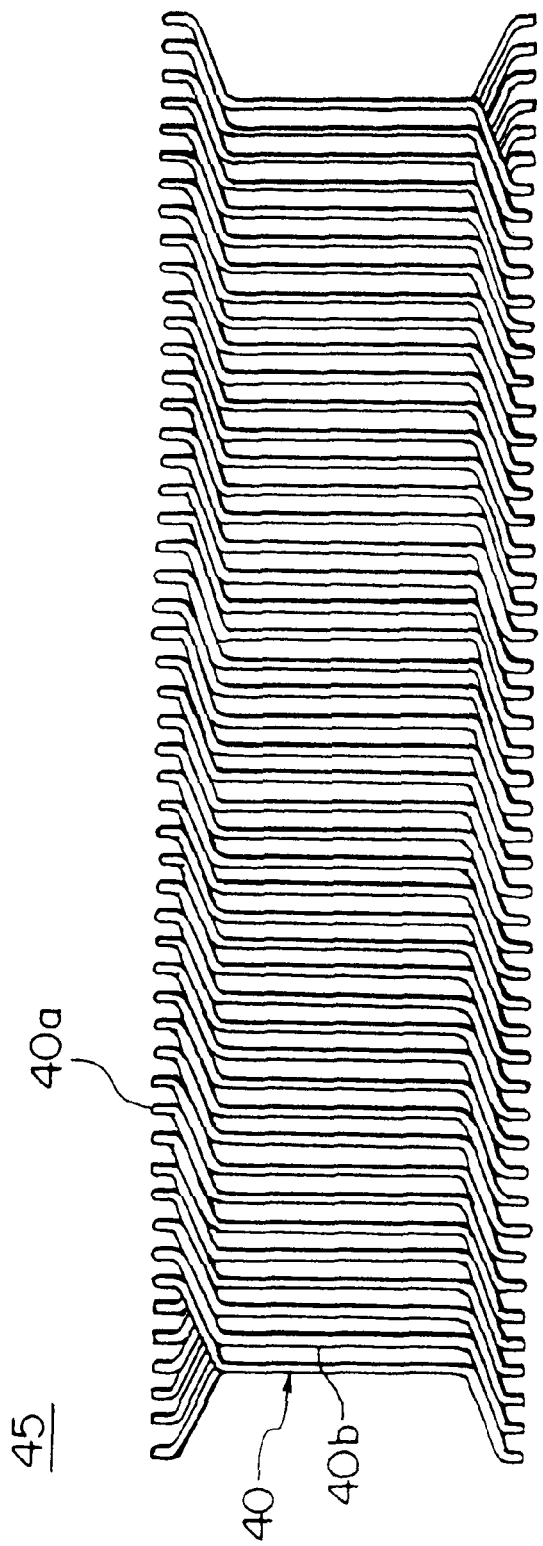
FIG. 21 is a plan showing a small winding group constituting part of the stator winding used in the automotive alternator according to Embodiment 2 of the present invention before installation.
Figure 22:
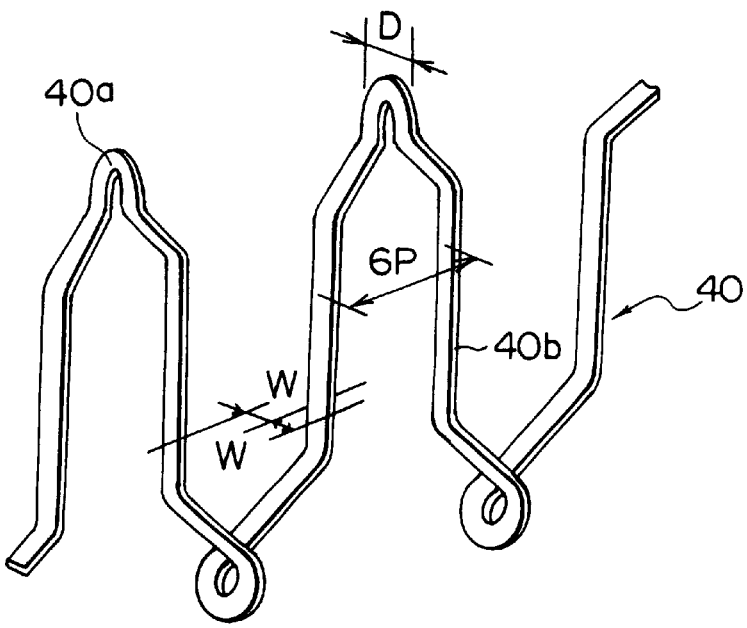
FIG. 22 is a perspective explaining the shape of a strand of wire constituting part of the small winding group shown in FIG. 21.

First, a small wire-strand group 45 is formed by bending twelve long strands of wire 40 as shown in FIG. 21. As shown in FIG. 22, each strand of wire 40 is formed by bending it into a planar pattern in which straight portions 40b connected by turn portions 40a are lined up at a pitch of six slots (6P). Adjacent straight portions 40b are offset by a distance equal to one width (W) of the strands of wire 40 by means of the turn portions 40a.

Figure 23:
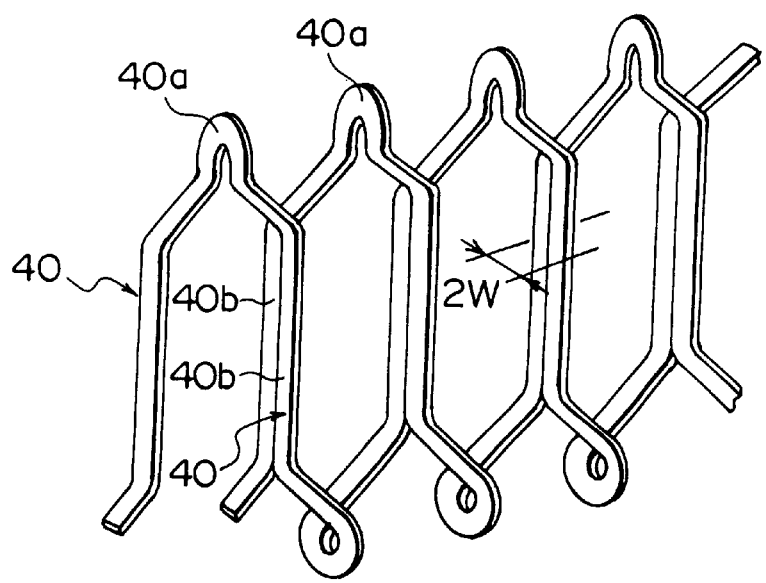
FIG. 23 is a perspective explaining arrangement of the strands of wire in the small winding group shown in FIG. 21.

The small wire-strand group 45 is constructed by arranging six small wire-strand pairs so as to be offset by a pitch of one slot from each other, each small wire-strand pair consisting of two strands of wire 40 formed in the above pattern which are offset by a pitch of six slots and arranged such that straight portions 40b overlap as shown in FIG. 23. Six end portions of the strands of wire 40 each extend outwards from a first and a second side at a first and a second end of the small wire-strand group 45. Furthermore, the turn portions 40a are arranged so as to line up in rows on first and second side portions of the small wire-strand group 45.

Figure 24:
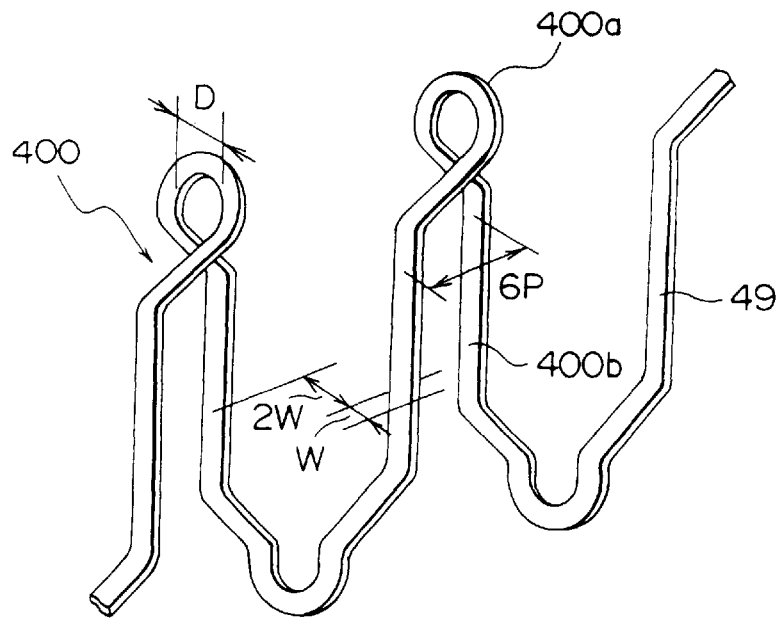
FIG. 24 is a perspective explaining the shape of a strand of wire constituting part of a large winding group constituting part of the stator winding used in the automotive alternator according to Embodiment 2 of the present invention.

Next, although not shown, a large wire-strand group is formed by bending twelve long strands of wire 400. As shown in FIG. 24, each strand of wire 400 is formed by bending it into a planar pattern in which straight portions 400b connected by turn portions 400a are lined up at a pitch of six slots (6P). Adjacent straight portions 400b are offset by substantially twice the width (2W) of the strands of wire 400 by means of the turn portions 400a. Furthermore, the inside diameter of the turn portions 400a of the strands of wire 400 constituting the large wire-strand group is formed to be generally equal to the outside diameter (D) of the turn portions 40a of the strands of wire 40 constituting the small wire-strand group 45.

Figure 25:
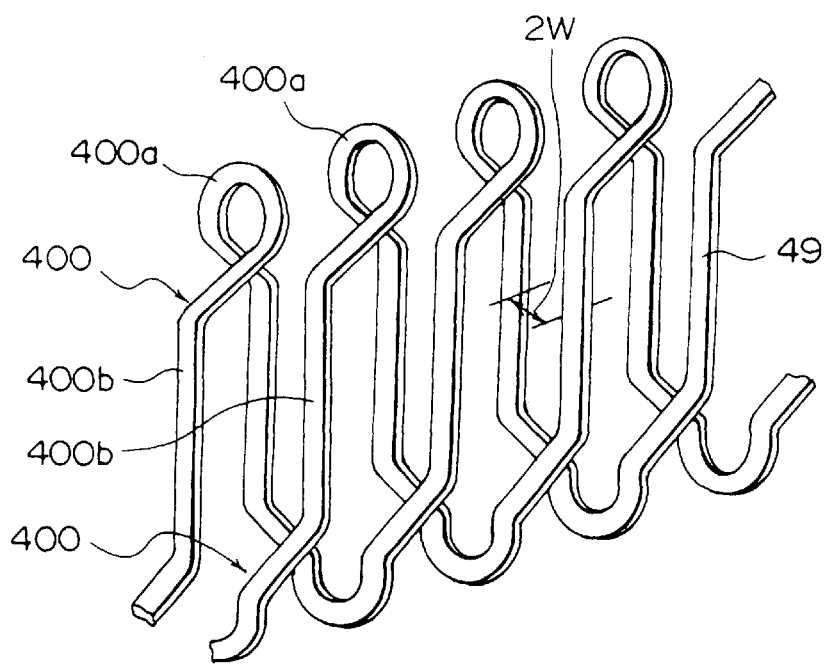
FIG. 25 is a perspective explaining arrangement of the strands of wire in the large winding group constituting part of the stator winding used in the automotive alternator according to Embodiment 2 of the present invention.

The large wire-strand group is constructed by arranging six large wire-strand pairs so as to be offset by a pitch of one slot from each other, each large wire-strand pair consisting of two strands of wire 400 formed in the above pattern which are offset by a pitch of six slots and arranged such that straight portions 400b overlap as shown in FIG. 25. Six end portions of the strands of wire 400 each extend outwards from a first and a second side at a first and a second end of the large wire-strand group. Furthermore, the turn portions 400a are arranged so as to line up in rows on first and second side portions of the large wire-strand group.

Moreover, the strands of wire 400 in the large wire-strand group are identical to the strands of wire 40 in the small wire-strand group 45. Except for differences in the diameter of the turn portions and the amount of offset of the straight portions 400b, the large wire-strand group has the same construction as the small wire-strand group 45.

Figure 26:
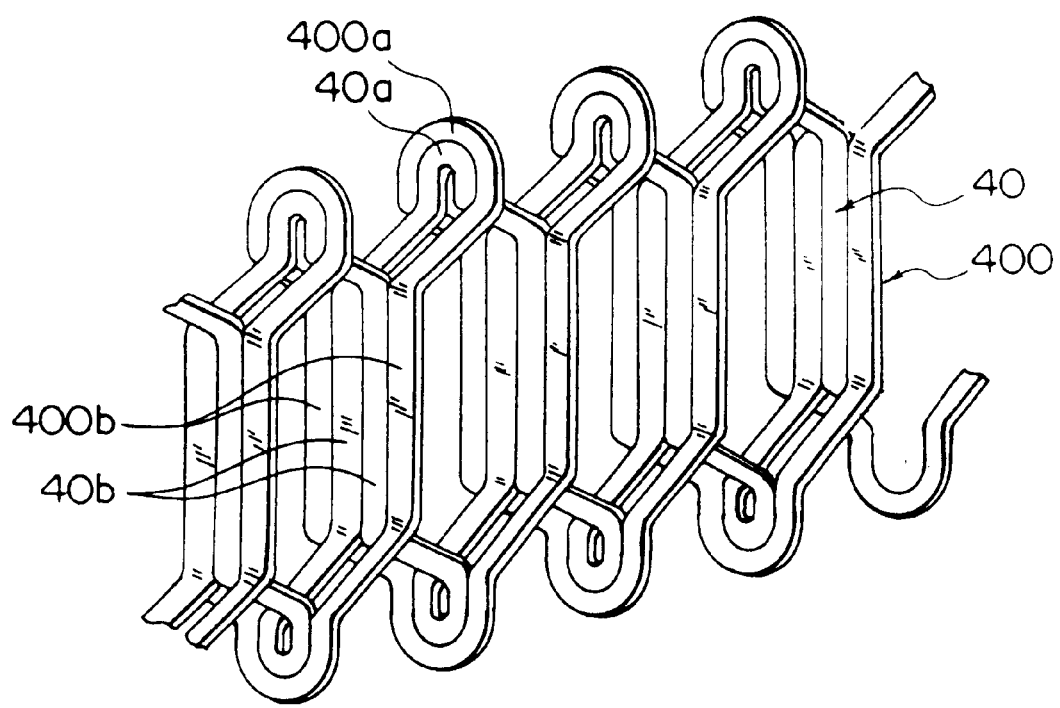
FIG. 26 is a perspective explaining arrangement of the strands of wire in a winding group in the stator used in automotive alternator according to Embodiment 2 of the present invention.

Next, the small wire-strand group 45 constructed in this manner is inserted inside the large wire-strand group to obtain a double wire-strand group. At this time, the turn portions 400a of the large wire-strand group are positioned within the double wire-strand group so as to surround the turn portions 40b of the small wire-strand group 45, and the straight portions 400b of the large wire-strand group are positioned on both sides of the straight portions 40b of the small wire-strand group as shown in FIG. 26. Moreover, FIG. 26 shows part of the first to fourth winding subportions 41 to 44 constituting one phase of stator winding group.

Next, although not shown, insulators 19 are mounted in the slots 36a of the parallelepiped core 36, and the double wire-strand group is installed in the parallelepiped core 36 by inserting the straight portions 40b and 400b of the double wire-strand group into each of the slots 36a. In this manner, the straight portions 40b and 400b of the strands of wire 40 and 400 are housed in lines of four in a radial direction within the slots 36a and are electrically insulated from the parallelepiped core 36 by the insulators 19.

Figure 27:
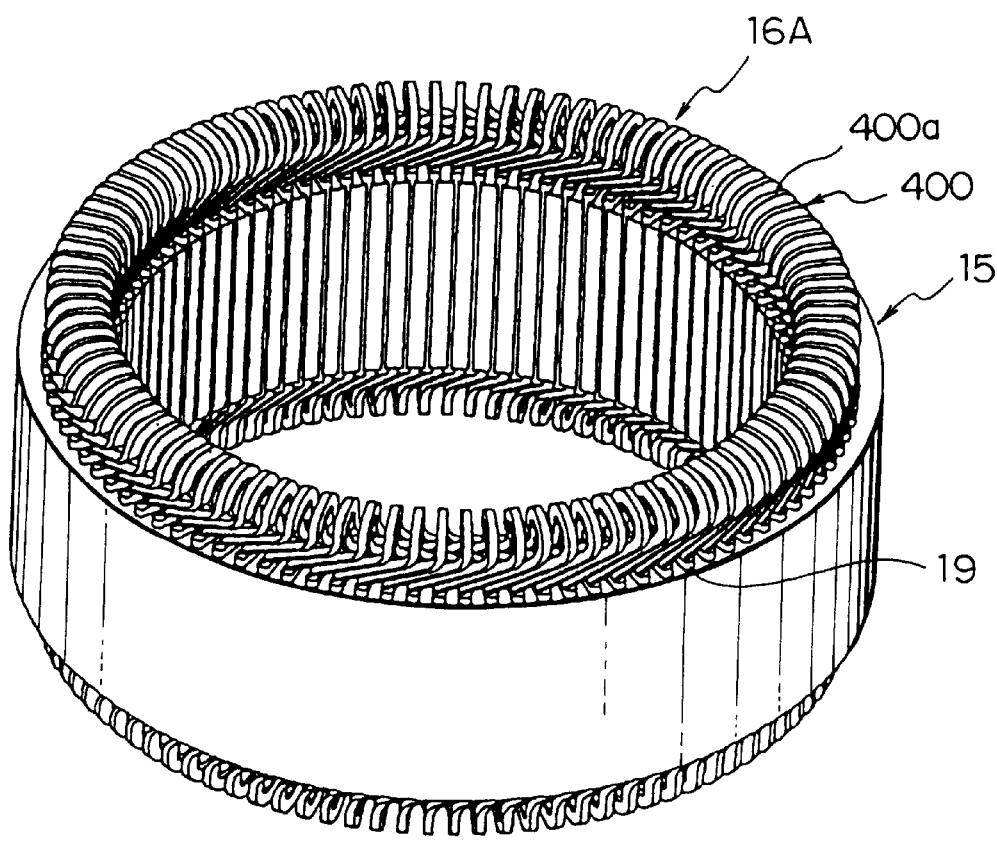
FIG. 27 is a perspective showing a stator used in the automotive alternator according to Embodiment 2 of the present invention.
Figure 28:
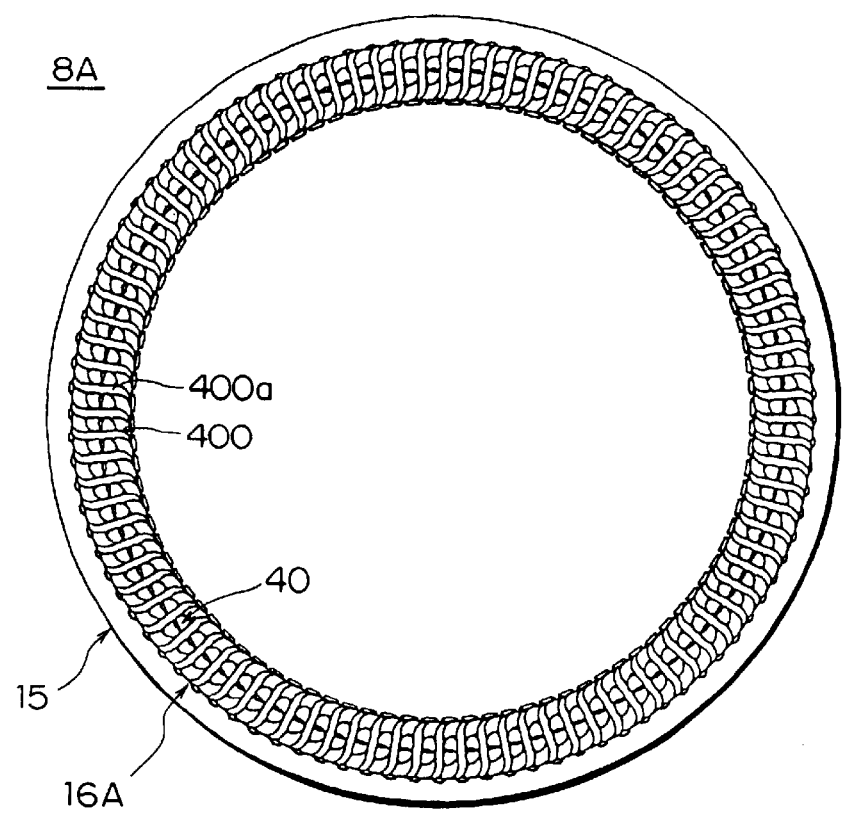
FIG. 28 is an end elevation of the stator used in the automotive alternator according to Embodiment 2 of the present invention.
Figure 29:
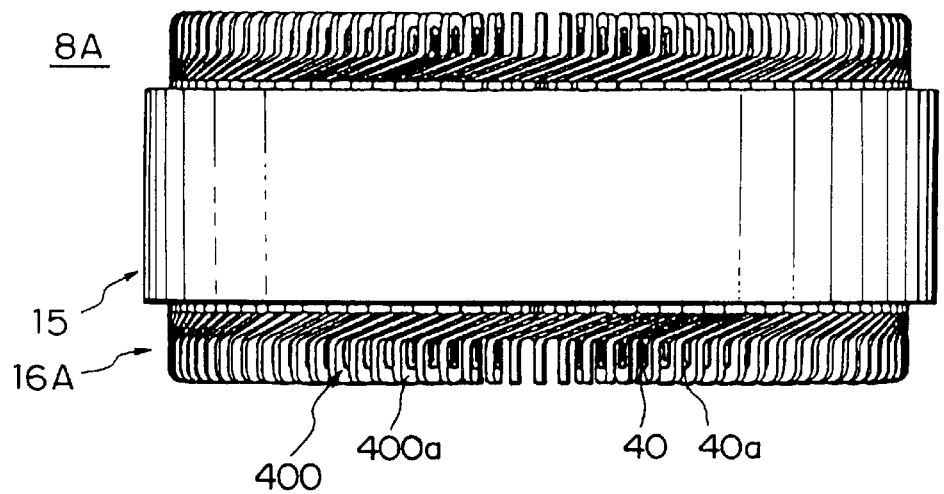
FIG. 29 is a side elevation of the stator used in the automotive alternator according to Embodiment 2 of the present invention.

After that, the parallelepiped core 36 is rolled up and its ends abutted and laser welded to each other to obtain a cylindrical core 37. Then, the polyphase stator winding 16A is formed by connecting the end portions of the strands of wire 40 and 400 based on the connections shown in FIG. 20. Thereafter, as for other embodiments, the cylindrical core 37 is inserted into a cylindrical outer core 38 composed of laminated SPCC material and integrated by shrink fitting to obtain the stator 8A shown in FIGS. 27 to 29.

In the stator 8A constructed in this manner, the strands of wire 40 and 400 constituting the first to fourth winding sub-portions 41 to 44 are each wound into a wave winding so as to extend out of first slots 15a at end surfaces of the stator core 15, fold back, and enter second slots 15a six slots away. Then, the turn portions 40a and 400a of the strands of wire 40 and 400 extend outwards from the stator core 15 and fold back to form coil ends. The turn portions 40a and 400a which are formed such that the turn portions 400a of the large wire-strand group surround the turn portions 40b of the small wire-strand group 45 are arranged neatly in two rows circumferentially, to form coil-end portions 16a and 16b.

Consequently, because the laminated core 36 into which the stator winding is inserted has the same highly-rigid end plates as in Embodiment 1, the same effects can be obtained in Embodiment 2 as in Embodiment 1.

Furthermore, according to Embodiment 2, because the turn portions 40a and 400a are stacked in two layers and arranged in rows circumferentially, coil-end height is raised by the width of one strand of wire, but the spacing between the turn portions 40a and 400a is increased in the circumferential direction, preventing short-circuiting accidents between the strands of wire.

Furthermore, increases in the number of turns in the polyphase stator winding can be easily adapted for by winding wire-strand groups composed of continuous wire so as to stack up on top of each other in the height direction.

Embodiment 3

Figure 30:
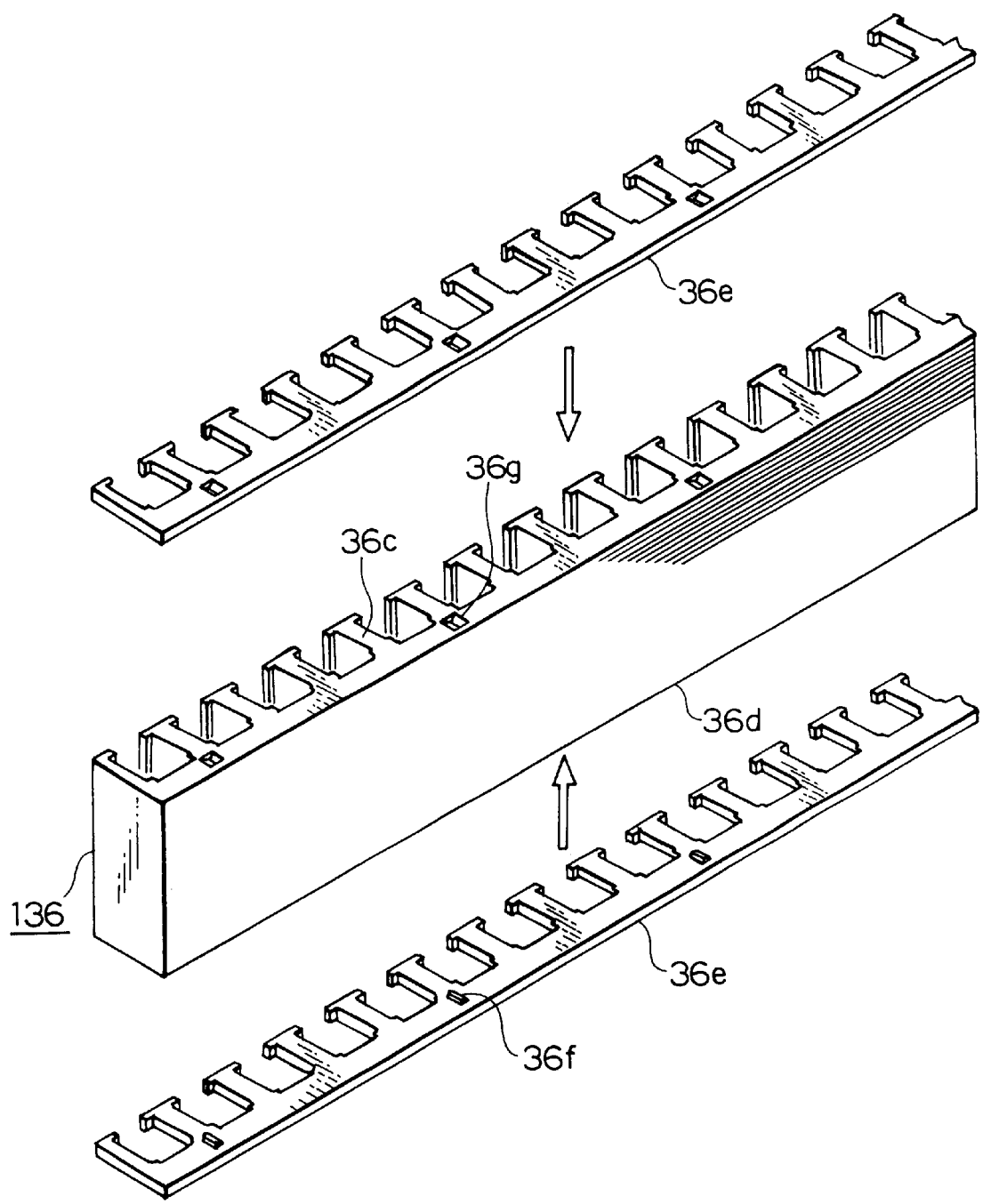
FIG. 30 is a perspective explaining the construction of a stator core of a stator used in the automotive alternator according to Embodiment 3 of the present invention.

FIG. 30 is a perspective explaining the construction of a stator core of a stator used in the automotive alternator according to Embodiment 3 of the present invention. In a laminated core 136 according to this embodiment, protruding portions 36f are formed on main surfaces of the end plates 36e facing the main lamination plates 36d. A number of the protruding portions 36f are formed along a longitudinal direction. Because the protruding portions 36f are formed by means of a press exerting a pressing force from one side, forming an indentation on the side on which the pressing force is exerted and a projection on the opposite side, the protruding portions 36f can be formed at the same time as the slots and the teeth are punched, eliminating the need for a separate process. The rest of the construction is the same as in Embodiment 1.

At the same time, recessed portions 36g are formed in the surfaces of the main lamination plates 36d facing the end plates 36e in positions corresponding to the protruding portions 36f. When the end plates 36e and the main lamination plates 36d are laminated, the protruding portions 36f and the recessed portions 36g fit together, positioning the end plates 36e and the main lamination plates 36d relative to each other and forming integrating engaged portions.

Thus, according to Embodiment 3, because integrating engaged portions are disposed on the end plates 36e and the main lamination plates 36d facing the end plates 36e positioning the end plates 36e and the main lamination plates 36d relative to each other, positioning is easily achieved during the assembly operation, and when the product is finished, the strength of the joints between the end plates 36e and the main lamination plates 36d is increased, enabling reliability of the product to be increased.

Moreover, in this embodiment, the protruding portions are formed on the end plates 36e and the recessed portions are formed on the main lamination plates 36d, but the same effects can be achieved form the engaged portions even if the recessed portions are formed on the end plates 36e and the protruding portions are formed on main lamination plates 36d.

Embodiment 4

Figure 31:
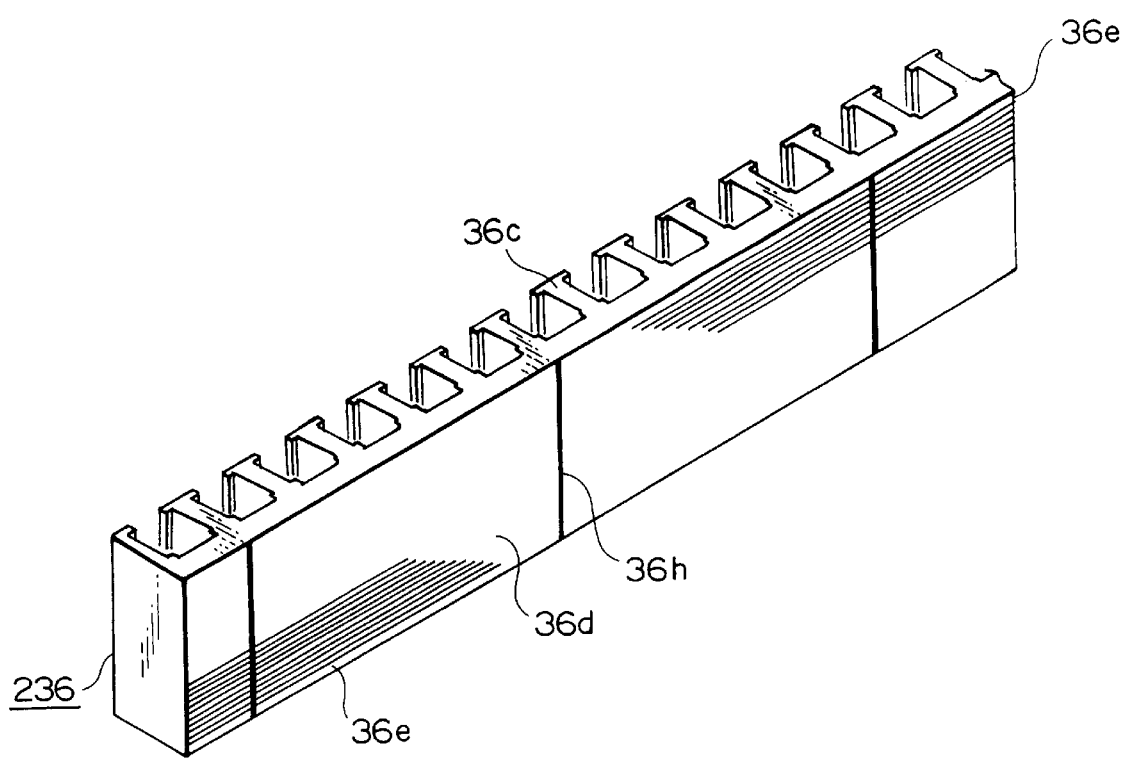
FIG. 31 is a perspective explaining the construction of a stator used in the automotive alternator according to Embodiment 4 of the present invention.

FIG. 31 is a perspective explaining the construction of a stator used in the automotive alternator according to Embodiment 4 of the present invention. In a laminated core 236 according to this embodiment, weld portions 36h integrating the laminated main lamination plates 36d and end plates 36e are formed along the direction of lamination on a rear surface on the opposite side of the teeth on portions positioned exactly behind the teeth 36c.

The rest of the construction is the same as in Embodiment 1.

Thus, according to Embodiment 4, the main lamination plates 36d and the end plates 36e are integrated by aligning the portions positioned behind the teeth 36c on the surface on the opposite side from the teeth 36c in the direction of lamination and laser-welding them to each other. That is to say, the weld portions 36h are formed into a portion with considerable radial thickness. For that reason, even if there are changes in structure due to welding, there is no decrease in strength in the circumferential direction with respect to rolling, and because there is no folding or bending at the weld portions 36h in the process of rolling up the laminated core 236, reliability is improved. Furthermore, these are positions away from the magnetic circuit passing from the teeth to the core-back to the teeth, enabling deterioration in output due to the influence of the weld to be reduced. Moreover, in this embodiment, the weld portions 36h are laser-welded but this method is not the only one that can be used.

Embodiment 5

Figure 32:
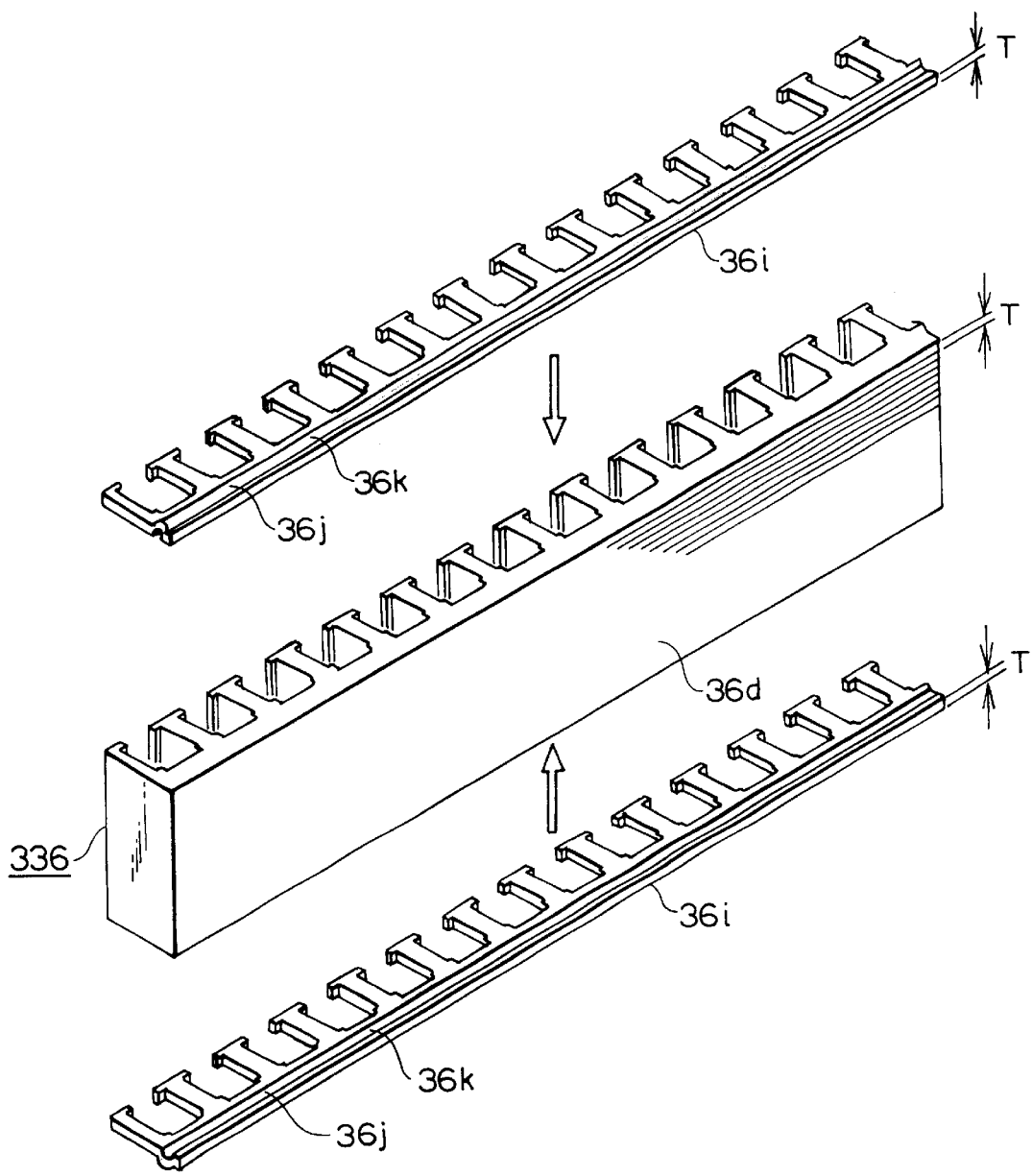
FIG. 32 is a perspective explaining the construction of a stator used in the automotive alternator according to Embodiment 5 of the present invention.

FIG. 32 is a perspective explaining the construction of a stator used in the automotive alternator according to Embodiment 5 of the present invention. In a laminated core 336 according to this embodiment, circumferential rigidity is increased by disposing ribs 36j on end plates 36i along a circumferential direction. Thickness of the end plates 36i is made the same as that of the main lamination plates 36d.

The ribs 36j are formed by deforming a yoke 36k extending along a circumferential portion of each of the end plates 36i into a curved cross section. The direction of the curve is made to be convex on the opposite side from the main lamination plates 36d so that there is no obstacle to the connections between the end plates 36i and the main lamination plates 36d.

The rest of the construction is the same as in Embodiment 1.

Thus, according to Embodiment 5, by disposing the ribs 36j on main surfaces of the end plates 36i on the opposite sides from the main lamination plates 36d, rigidity is made greater than that of the main lamination plates 36d. For that reason, the end plates 36i can be prepared by additional processing of the same material as the main lamination plates 36d, enabling reductions in the cost of the product. In addition, when the main lamination plates 36d are punched from an iron plate, the end plates 36i can also be prepared by pressing so as to form ribs 36j at the same time.

Embodiment 6

Figure 33:
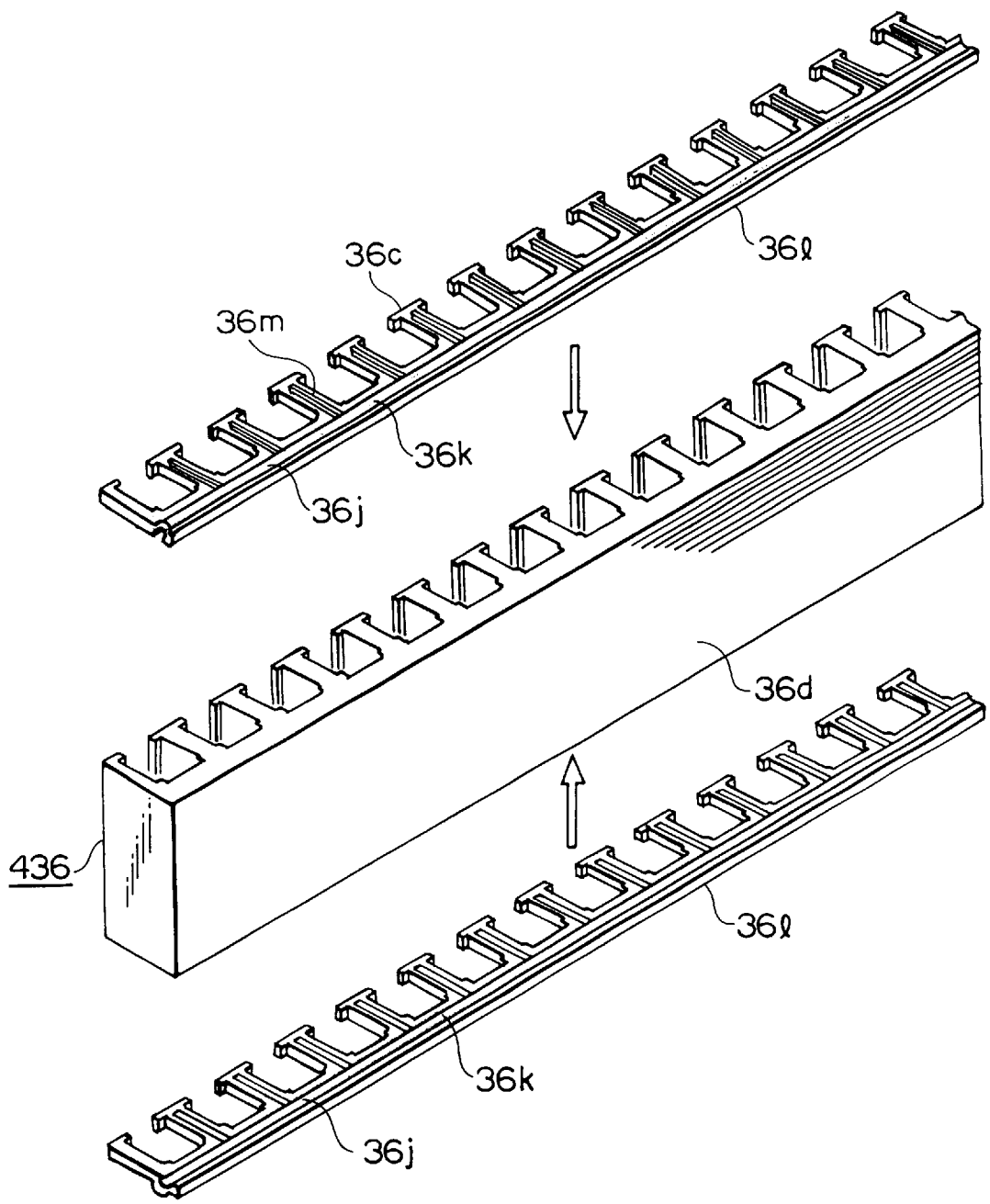
FIG. 33 is a perspective explaining the construction of a stator used in the automotive alternator according to Embodiment 6 of the present invention.
Figure 34:
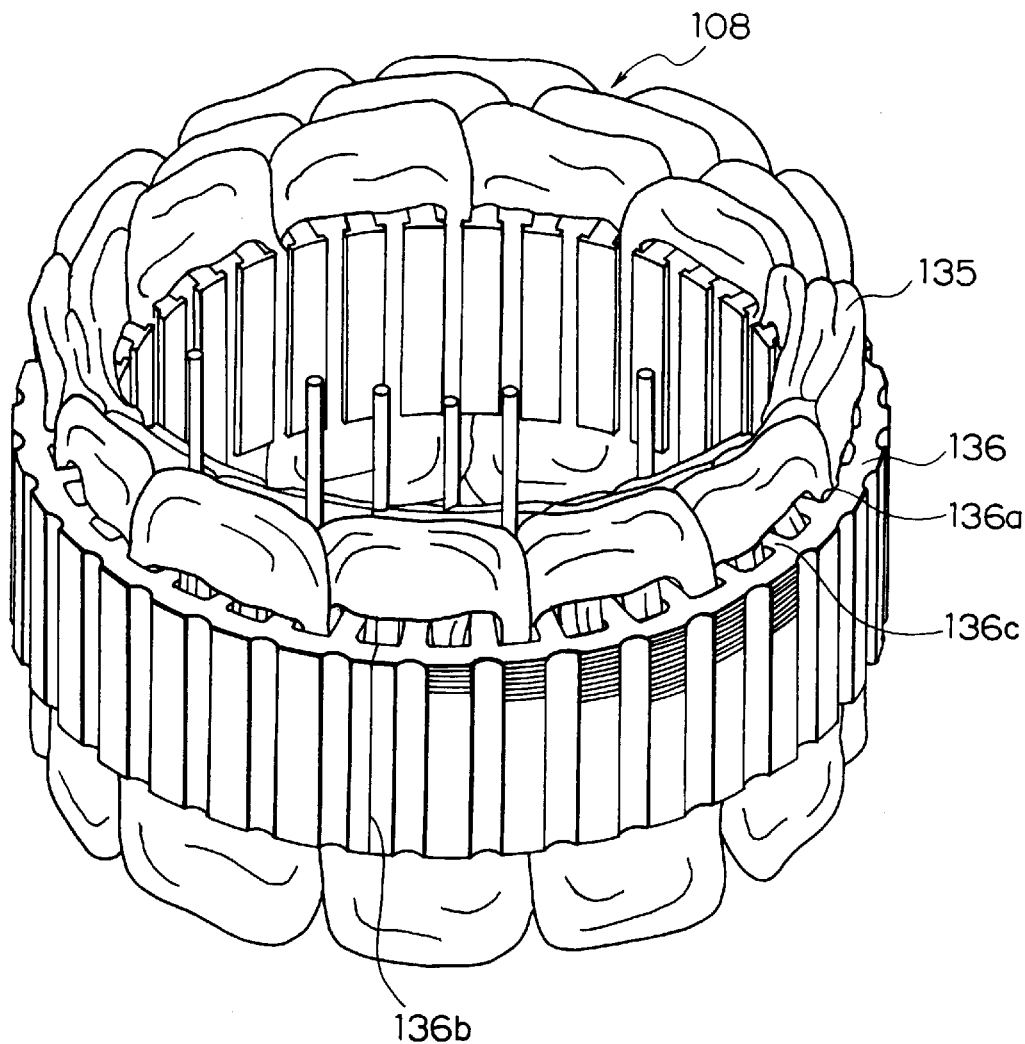
FIG. 34 is a perspective showing an example of a stator of a conventional automotive alternator.
Figure 35:
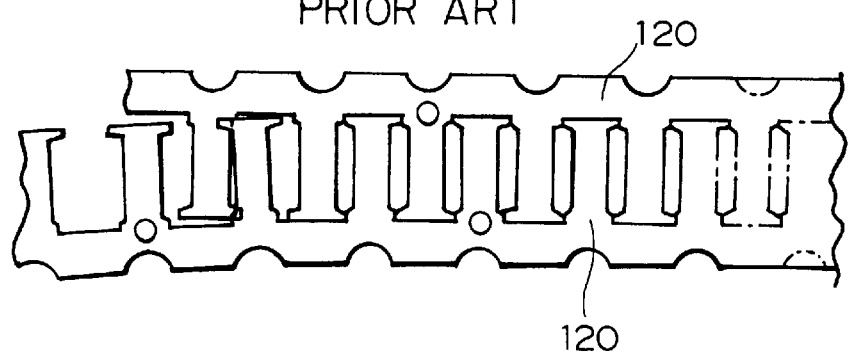
FIG. 35 is a partial plan showing belt-shaped bodies constituting part of a stator core.
Figure 36:
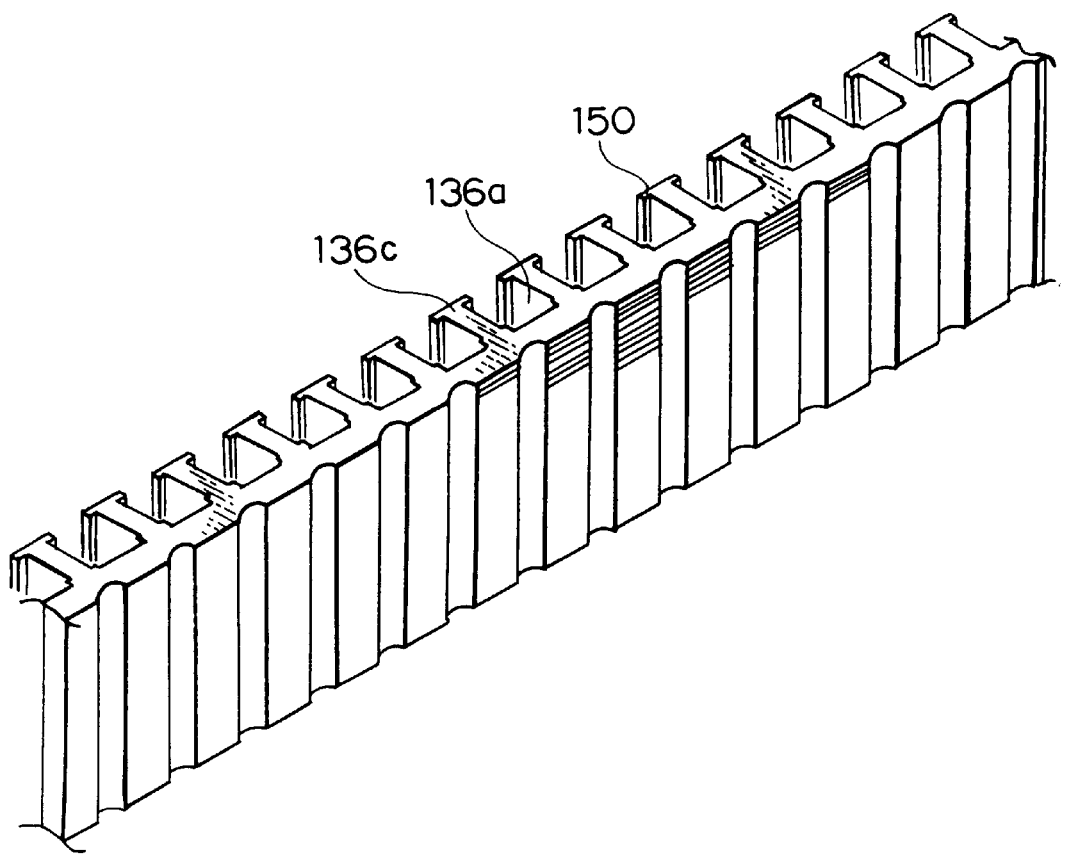
FIG. 36 is a perspective showing the stator core in FIG. 34 before shaping.
Figure 37:
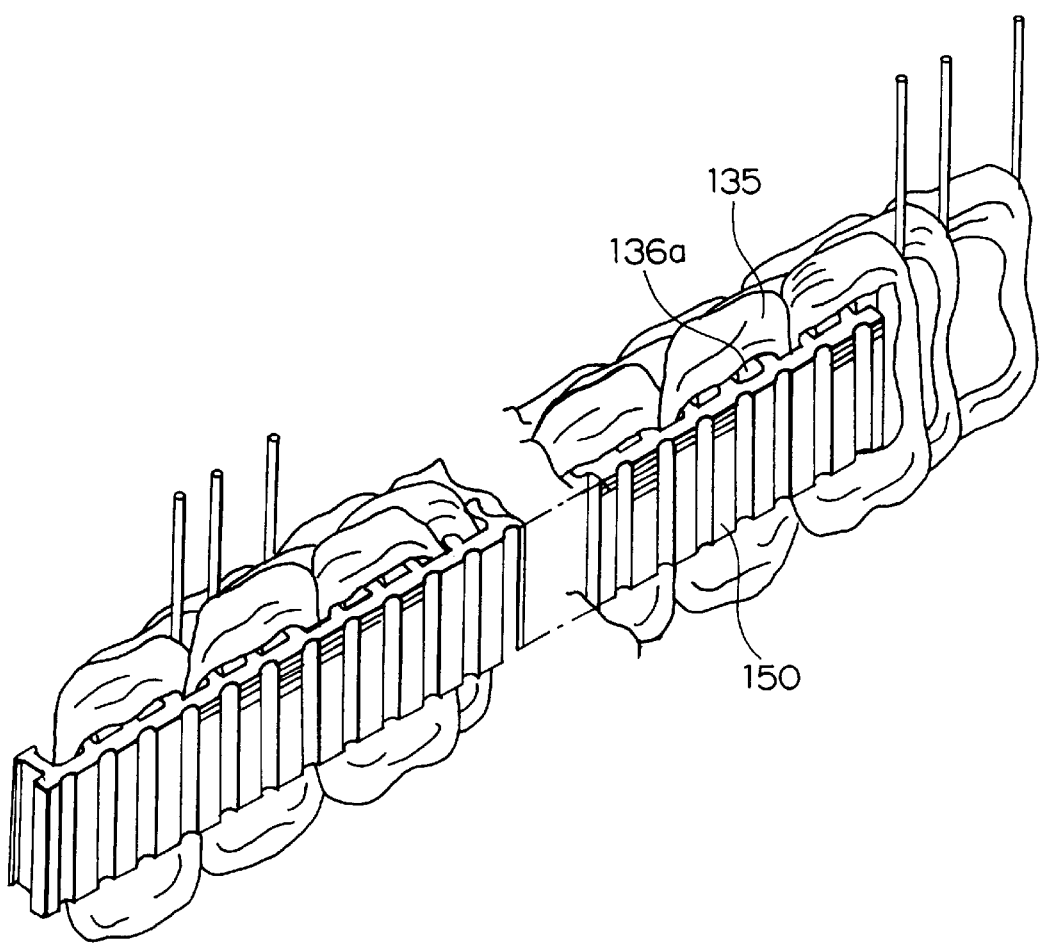
FIG. 37 is a perspective showing the arrangement of the stator winding groups in the laminated body in FIG. 36.
Figure 38:
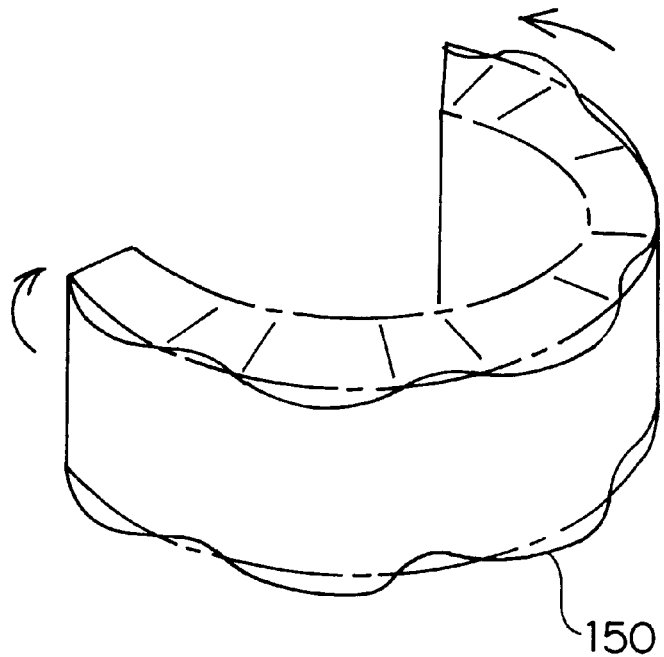
FIG. 38 is a perspective showing deformation of the stator of a conventional automotive alternator when being shaped into a cylinder.
Figure 39:
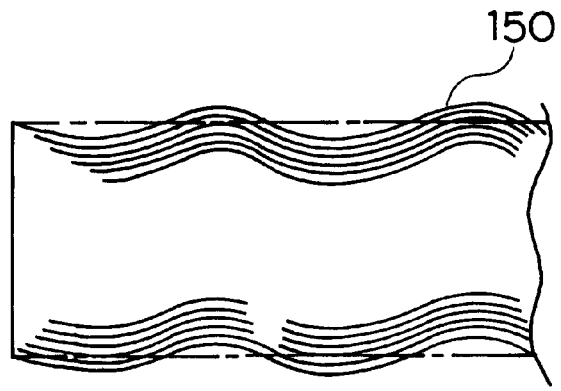
FIG. 39 is a side elevation showing deformation of the stator of a conventional automotive alternator.

FIG. 33 is a perspective explaining the construction of a stator used in the automotive alternator according to Embodiment 6 of the present invention. In a laminated core 436 according to this embodiment, circumferential rigidity and radial rigidity of end plates 361 are increased by providing ribs 36m along a radial direction of teeth 36c in addition to the ribs 36j formed along the circumferential direction. As in Embodiment 5, the thickness of the end plates 361 is made the same as that of the main lamination plates 36d.

In the same manner as for the ribs 36j, when the main lamination plates 36d are punched from an iron plate, the end plates 361 can also be prepared by pressing so as to form the ribs 36m at the same time.

The rest of the construction is the same as in Embodiment 5.

Thus, according to Embodiment 6, because the ribs 36m formed on the teeth in the radial direction are provided on the end plates 361, the radial rigidity can be increased and the reliability of the product can be improved.

Moreover, in this embodiment, though the ribs 36m and the ribs 36j are disposed so as to be connected to each other, the same effect can be obtained even if they are disposed so as to be separated from each other.

According to one aspect of the present invention, there is provided an automotive alternator including:
  a rotor;
  a stator disposed facing an outer circumference of the rotor; and
  a bracket for supporting the rotor and the stator,
  the automotive alternator further including:
    a stator core including a laminated core formed circumferentially with a number of slots extending axially; and
    a polyphase stator winding installed in the slots at a predetermined slot pitch,
    the laminated core being formed into an annular shape by:
      forming a main laminated body by laminating a number of main lamination plates formed with a number of teeth defining the slots on one side of a yoke;
      forming a laminated body by laminating an end plate having higher rigidity than the main lamination plates onto at least one end surface of the main laminated body in a direction of lamination;
      disposing the polyphase stator winding in the slots; and
      placing end portions of the laminated body in contact with each other by bending the laminated body such that opening portions of the slots are on an inner circumferential side. For that reason, it is possible to reduce deformation of the laminated core such as undulating in the process of forming the cylindrical shape. Furthermore, it is possible to prevent gaps from opening up between the main lamination plates and the end plates.

Furthermore, the laminated body may also be rectilinear in shape prior to bending. For that reason, the polyphase stator winding subportion can be easily disposed inside the slots, improving operability. Furthermore, an improved rigidity can be aimed at by making a rectilinear shape with absolutely no curvature in the circumferential direction, enabling the material yield rate to be further improved.

Furthermore, the polyphase stator winding may also include a number of winding sub-portions in each of which a long strand of wire is wound so as to alternately occupy an inner layer and an outer layer in a slot depth direction within the slots at intervals of a predetermined number of slots, the strands of wire folding back outside the slots at axial end surfaces of the stator core to form turn portions; and the turn portions of the strands of wire may also align in a circumferential direction to constitute coil end groups. For that reason, even in a stator which includes a number of winding sub-portions in each of which a long strand of wire is wound so as to alternately occupy an inner layer and an outer layer in a slot depth direction within the slots at intervals of a predetermined number of slots, the strands of wire folding back outside the slots at axial end surfaces of the stator core to form turn portions, it is possible to reduce deformation of the laminated core such as undulating.

Furthermore, the rotor may also include a rotor winding for generating magnetic flux on passage of an electric current and a rotor core covering the rotor winding, a number of claw-shaped magnetic poles being formed in the rotor core by the magnetic flux; and the number of slots in the stator core may also be two or more per phase per pole. By applying the present invention to such an alternator in which the rigidity of the laminated body is reduced because there is a large number of slots and the circumferential dimensions of the teeth are small, the effect of the end plate is increased.

2n strands of the strands of wire may also be disposed in a row in the thickness direction in each of the slots, and the turn portions of the strands of wire may also be arranged so as to align into n rows in a circumferential direction, reducing the height of the coil ends and making space efficiency superior.

2n strands of the strands of wire may also be disposed in a row in the thickness direction in each of the slots, and the turn portions of the strands of wire may also be arranged so as to stack up into n layers, increasing the distance between the turn portions, thereby suppressing short-circuiting between the strands of wire.

Furthermore, interlocking portions may also be disposed in at least the end plate and the main laminated plates facing the end plate so as to connect both together. For that reason, during the assembly operation, positioning is facilitated, and when the product is finished, the strength of the joints between the end plates and the main lamination plates is increased, enabling reliability of the product to be increased.

Furthermore, the laminated plates and the end plate may also be integrated by being welded together in the direction of lamination at a rear surface portion of the teeth being a surface on the opposite side from the teeth. For that reason, even if there are changes in structure due to welding, there is no decrease in strength in the circumferential direction with respect to rolling, and because there is no folding or bending at the welded positions in the process of rolling up the laminated core, reliability is improved. Furthermore, because there is little influence on the magnetic circuit, output is not reduced.

Furthermore, rigidity of the end plate may also be made greater than the main lamination plates by making a thickness of the end plate greater than the main lamination plates. For that reason, a highly-rigid end plate can be manufactured easily.

Furthermore, rigidity of the end plate may also be made greater than the main laminated plates by providing ribs. For that reason, when the main laminated plates are punched from an iron plate, the end plate can be prepared by pressing so as to form the ribs at the same time, thus improving productivity.

In addition, the ribs may also be formed in at least a circumferential direction of the stator. For that reason, formation of the ribs is facilitated and because rigidity is improved in the circumferential direction, deformation of the laminated core such as undulating can be reliably reduced.

What is claimed is:

1. An automotive alternator comprising:
    a rotor;
    a stator disposed facing an outer circumference of said rotor; and
    a bracket for supporting said rotor and said stator, said stator comprising:
        a stator core comprising a laminated core having an annular shape and including a number of slots extending axially with opening portions located on an inner circumferential side of said laminated core; and
        a polyphase stator winding installed in said slots at a predetermined slot pitch,
        said laminated core comprising a main laminated body including a plurality of main lamination plates which are laminated together and have a plurality of teeth defining said slots on one side of a yoke, and an end plate laminated onto at least one end surface of said main laminated body in a direction of lamination, wherein said end plate has a higher rigidity than each of said main lamination plates.

2. The automotive alternator according to claim 1 wherein said laminated core is rectilinear in shape prior to said bending.

3. The automotive alternator according to claim 1 wherein:
    said polyphase stator winding comprises a number of winding sub-portions in each of which a long strand of wire is wound so as to alternately occupy an inner layer and an outer layer in a slot depth direction within said slots at intervals of a predetermined number of slots, said strands of wire having turn portions outside said slots at axial end surfaces of said stator core; and
    said turn portions of said strands of wire align in a circumferential direction to constitute coil end groups.

4. The automotive alternator according to claim 1 wherein:
    said rotor comprises a rotor winding for generating magnetic flux on passage of an electric current and a rotor core covering said rotor winding, a number of claw-shaped magnetic poles being formed in said rotor core by said magnetic flux; and
    said number of slots in said stator core is two or more per phase per pole.

5. The automotive alternator according to claim 1 wherein:
    2n strands of said strands of wire are disposed in a row in said slot depth direction in each of said slots; and
    said turn portions of said strands of wire are arranged so as to align into n rows in a circumferential direction.

6. The automotive alternator according to claim 1 wherein:
    2n strands of said strands of wire are disposed in a row in said thickness direction in each of said slots; and
    said turn portions of said strands of wire are arranged so as to stack up into n layers.

7. The automotive alternator according to claim 1 wherein interlocking portions are disposed in at least said end plate and said main laminated plates facing said end plate so as to connect both together.

8. The automotive alternator according to claim 1 wherein said laminated plates and said end plate are welded together in said direction of lamination at a rear surface portion of said teeth.

9. The automotive alternator according to claim 1 wherein rigidity of said end plate is made greater than said main lamination plates by making a thickness of said end plate greater than said main lamination plates.

10. The automotive alternator according to claim 1 wherein rigidity of said end plate is made greater than said main laminated plates by providing ribs on said end plate.

11. The automotive alternator according to claim 10 wherein said ribs are formed in at least a circumferential direction of said stator.

* * * * *